US009189407B2

(12) United States Patent
Zeidner et al.

(10) Patent No.: US 9,189,407 B2
(45) Date of Patent: Nov. 17, 2015

(54) PRE-FETCHING IN A STORAGE SYSTEM

(75) Inventors: Efraim Zeidner, Haifa (IL); Leo Corry, Ramat Gan (IL)

(73) Assignee: INFINIDAT LTD., Herzliya (IL)

(*) Notice: Subject to any disclaimer, the term of this patent is extended or adjusted under 35 U.S.C. 154(b) by 278 days.

(21) Appl. No.: 13/403,015

(22) Filed: Feb. 23, 2012

(65) Prior Publication Data

US 2012/0166734 A1 Jun. 28, 2012

Related U.S. Application Data

(63) Continuation-in-part of application No. 13/174,070, filed on Jun. 30, 2011.

(60) Provisional application No. 61/360,622, filed on Jul. 1, 2010, provisional application No. 61/391,657, filed on Oct. 10, 2010.

(51) Int. Cl.
*G06F 12/08* (2006.01)
*G06F 9/30* (2006.01)
*G06F 9/38* (2006.01)
*G06F 11/34* (2006.01)

(52) U.S. Cl.
CPC ........ *G06F 12/0868* (2013.01); *G06F 12/0862* (2013.01); *G06F 9/30047* (2013.01); *G06F 9/383* (2013.01); *G06F 11/3452* (2013.01); *G06F 2212/262* (2013.01); *Y02B 60/1225* (2013.01); *Y02B 60/165* (2013.01)

(58) Field of Classification Search
CPC .. G06F 9/383; G06F 12/0862; G06F 9/30047
See application file for complete search history.

(56) References Cited

U.S. PATENT DOCUMENTS

| | | | | |
|---|---|---|---|---|
| 7,130,890 B1 * | 10/2006 | Kumar et al. | ................ | 709/218 |
| 7,716,425 B1 * | 5/2010 | Uysal et al. | ................ | 711/137 |
| 2003/0221069 A1 * | 11/2003 | Azevedo et al. | ............. | 711/136 |
| 2004/0054939 A1 | 3/2004 | Guha et al. | | |
| 2005/0132212 A1 | 6/2005 | Haswell | | |
| 2006/0136684 A1 | 6/2006 | Le et al. | | |
| 2007/0106849 A1 * | 5/2007 | Moore et al. | ................ | 711/137 |
| 2008/0104431 A1 | 5/2008 | Shimada | | |
| 2009/0254636 A1 | 10/2009 | Acedo et al. | | |
| 2011/0225371 A1 * | 9/2011 | Spry | ........................... | 711/137 |

OTHER PUBLICATIONS

G. Majone, "Distance-based cluster analysis and measurement scales". Quality and Quantity, vol. 4 (1970), No. 1, pp. 153-164.

* cited by examiner

*Primary Examiner* — Charles Rones
*Assistant Examiner* — Tian-Pong Chang
(74) *Attorney, Agent, or Firm* — Reches Patents

(57) ABSTRACT

A storage system, a non-transitory computer readable medium and a method of pre-fetching. The method may include determining, by a pre-fetch module of the storage system, to fetch a certain data portion from a data storage device of the storage system to a cache memory of the storage system; wherein the certain data portion belongs to a certain statistical segment that belongs to at least one logical volume; determining, by a pre-fetch module of the storage system, to pre-fetch at least one additional data portion to the cache memory based upon input/output (I/O) activity statistics associated with the certain statistical segment; wherein the I/O activity statistics comprises timing information related to I/O activities; fetching the certain data portion; and pre-fetching the at least one additional data portion if it is determined to pre-fetch the at least one additional data portions.

42 Claims, 11 Drawing Sheets

| Activity counter (501) | Activity timestamp (502) | T1 (503) | T2 (504) | T3 (505) | Waste level (506) | Defrag. level (507) | Defrag. frequency (508) |
|---|---|---|---|---|---|---|---|
| | | | | | | | |

Figure 5

PRE-FETCHING IN A STORAGE SYSTEM

CROSS-REFERENCES TO RELATED APPLICATIONS

This patent application is a continuation in part of U.S. patent application Ser. No. 13/174,070 filed on Jun. 30, 2011 that in turn claims priority from U.S. Provisional Patent Application No. 61/360,622 filed on Jul. 1, 2010 and U.S. Provisional Patent Application No. 61/391,657 filed on Oct. 10, 2010, all being incorporated herein by reference in their entirety.

FIELD OF THE INVENTION

The present invention relates generally to mass data storage systems and, particularly, to management of storage resources thereof.

BACKGROUND OF THE INVENTION

Modern large scale information systems utilize special storage systems or devices that may include thousand of magnetic/optical disks and other storage media. Usually, the storage system or device is serving several clients/hosts via various types of communication link (LAN, WAN, wireless, direct connection etc.). A host device is any type of electronic device that has a need either to access data stored on the storage system or to store data in the storage system/device.

When a host device (also referred to as host computer) sends data to a storage device, the storage device may store the data on one or more storage media including hard disk drives, optical storage drives, magnetic tape drives, or semiconductor storage devices. In a typical implementation, the storage device is configured as a storage controller that controls a plurality of hard disk drives.

The host reads data from the storage device by requesting the data from the storage device. In response to the request, the storage device retrieves the data from the storage media and communicates the data to the host.

Unfortunately, there is typically a significant delay between when the storage device receives the request and when the storage device is able to communicate the data.

Data pre-fetching techniques are used to reduce drastically the above mentioned delay. The main scheme of these techniques is that the storage device retrieves data in advance from slow storage media and write the data to the cache. The cache is able to receive and communicate data much faster than the electro-mechanical storage media such as magnetic disk, reducing the time required to perform reads. Hence when the storage device receives request from a host for the data, the requests is serviced from the high speed cache instead of the magnetic/optical disk which takes longer time. In this way, data is communicated to the host much faster.

In general, a main problem related with any implementation of pre-fetch methods is that the storage device is unable to decide with 100% certitude which of the pre-fetched data will be actually used by the host. It should be noticed that the system pays a price (both in terms of disk activity and cache space) for pre-fetch, and hence we need to reduce the amount of false pre-fetch decisions.

There is a need to develop pre-fetch methods that are based on intelligent criteria that correctly pre-fetch accurate amounts of data and reduces the number of false pre-fetch operations.

SUMMARY OF THE INVENTION

According to an embodiment of the invention a method of pre-fetching may be provided and may include determining, by a pre-fetch module of a storage system, to fetch a certain data portion from a data storage device of the storage system to a cache memory of the storage system; wherein the certain data portion belongs to a certain statistical segment that belongs to at least one logical volume; determining, by a pre-fetch module of the storage system, to pre-fetch at least one additional data portion to the cache memory based upon input/output (I/O) activity statistics associated with the certain statistical segment; wherein the I/O activity statistics comprises timing information related to I/O activities; fetching the certain data portion; and pre-fetching the at least one additional data portion if it is determined to pre-fetch the at least one additional data portions.

The certain data portion and all of the at least one additional data portion belong to the certain statistical segment.

The one or more additional data portions belong to an additional statistical segment that differs from the certain statistical segment.

The method may include determining to pre-fetch the at least one additional data portion in response to I/O activity statistics of the additional statistical segment.

The similarity between I/O activity statistics of the certain statistical segment and an I/O activity statistics of the additional statistical segment can exceed a similarity threshold.

The method may include updating the similarity threshold.

The I/O activity statistics may represent a frequency of I/O activities.

The I/O activity statistics may represent types of I/O activities.

The I/O activity statistics may represent types and frequency of I/O activities.

The I/O activity statistics may be represented by an activity vector.

The certain data portion and the at least one additional data portion may be all the data portions of the certain statistical segment.

The certain data portion and the at least one additional data portion may be a subset of all the data portions of the certain statistical segment.

The method may include determining, by a pre-fetch module, to pre-fetch the at least one additional data portion of the certain statistical segment to the cache memory if an I/O activity level associated with the certain statistical segment is below an activity threshold.

The method may include determining, by a pre-fetch module, to pre-fetch at least one additional data portion of the certain statistical segment to the cache memory if an I/O activity level associated with the certain statistical segment is above an activity threshold.

The method may include determining, by a pre-fetch module, to pre-fetch the at least one additional data portion of the certain statistical segment to the cache memory if an I/O activity level associated with the certain statistical segment belongs to a certain range of I/O activity levels out of multiple different I/O activity levels.

The method may include determining not to pre-fetch the at least one additional data portion of the certain statistical segment if the I/O activity level associated with the certain statistical segment is above the activity threshold.

The method may include determining not to pre-fetch the at least one additional data portion of the certain statistical segment if the I/O activity level associated with the certain statistical segment is below the activity threshold.

The method may include maintaining virtual buckets, wherein different virtual buckets maintain lists of statistical segments accessed during different time intervals.

The method may include determining to pre-fetch additional data portions that belong to at least one additional statistical segment that is listed in a virtual bucket in which the certain statistical segment is listed.

The method may include determining to pre-fetch additional data portions that belong to at least one additional statistical segment that is listed in a virtual bucket that is proximate to a virtual bucket in which the certain statistical segment is listed.

According to an embodiment of the invention a storage device may be provided and may include a cache memory; at least one data storage device that differs from the cache memory; an I/O activity statistical module arranged to generate I/O activity statistics for each statistical segment out of multiple statistical segments of a virtual unit space; a fetch module arranged to determine to fetch a certain data portion from a data storage device; wherein the certain data portion belongs to a certain statistical segment that belongs to at least one logical volume; and to fetch the certain data portion; and a pre-fetch module arranged to determine to pre-fetch at least one additional data portion to the cache memory based upon an input/output (I/O) activity pattern associated with the certain statistical segment; wherein the I/O activity pattern comprises timing information related to I/O activities; and to pre-fetch the at least one additional data portion if it is determined to pre-fetch the at least one additional data portions.

The certain data portion and all of the at least one additional data portion may belong to the certain statistical segment.

The one or more additional data portions may belong to an additional statistical segment that differs from the certain statistical segment.

The pre-fetch module may be arranged to determine to pre-fetch the at least one additional data portion in response to I/O activity statistics of the additional statistical segment.

The similarity between I/O activity statistics of the certain statistical segment and an I/O activity statistics of the additional statistical segment may exceed a similarity threshold.

The storage system may be arranged to update the similarity threshold.

The certain data portion and the at least one additional data portion may be all the data portions of the certain statistical segment.

The certain data portion and the at least one additional data portion may be a subset of all the data portions of the certain statistical segment.

The pre-fetch module may be arranged to determine to pre-fetch the at least one additional data portion of the certain statistical segment to the cache memory if an I/O activity level associated with the certain statistical segment is below an activity threshold.

The pre-fetch module may be arranged to determine to pre-fetch at least one additional data portion of the certain statistical segment to the cache memory if an I/O activity level associated with the certain statistical segment is above an activity threshold.

The pre-fetch module may be arranged to determine to pre-fetch the at least one additional data portion of the certain statistical segment to the cache memory if an I/O activity level associated with the certain statistical segment belongs to a certain range of I/O activity levels out of multiple different I/O activity levels.

The pre-fetch module may be arranged to determine not to pre-fetch the at least one additional data portion of the certain statistical segment if the I/O activity level associated with the certain statistical segment is above the activity threshold.

The pre-fetch module may be arranged to determine not to pre-fetch the at least one additional data portion of the certain statistical segment if the I/O activity level associated with the certain statistical segment is below the activity threshold.

The storage system may include an allocation unit that may be arranged to maintain virtual buckets, wherein different virtual buckets maintain lists of statistical segments accessed during different time intervals.

The pre-fetch module may be arranged to determine to pre-fetch additional data portions that belong to at least one additional statistical segment that is listed in a virtual bucket in which the certain statistical segment is listed.

The pre-fetch module may be arranged to determine to pre-fetch additional data portions that belong to at least one additional statistical segment that is listed in a virtual bucket that is proximate to a virtual bucket in which the certain statistical segment is listed.

According to an embodiment of the invention there may be provided a non-transitory computer readable medium that stores instructions for: determining, by a pre-fetch module of a storage system, to fetch a certain data portion from a data storage device of the storage system to a cache memory of the storage system; wherein the certain data portion belongs to a certain statistical segment that belongs to at least one logical volume; determining, by the pre-fetch module, to pre-fetch at least one additional data portion to the cache memory based upon an input/output (I/O) activity pattern associated with the certain statistical segment; wherein the I/O activity pattern comprises timing information related to I/O activities; fetching the certain data portion; and pre-fetching the at least one additional data portion if it is determined to pre-fetch the at least one additional data portions.

The non-transitory computer readable medium can be a disk, a diskette, a tape, can be read by electromagnetic means, magnetic means, optical means and the like. It can store instructions for executing any stage or any combination of stages of any methods mentioned in the specification.

BRIEF DESCRIPTION OF THE DRAWINGS

In order to understand the invention and to see how it can be carried out in practice, embodiments will now be described, by way of non-limiting example only, with reference to the accompanying drawings, in which:

FIG. 5 illustrates a schematic diagram of an activity vector in accordance with certain embodiments of the presently disclosed subject matter;

DETAILED DESCRIPTION OF EMBODIMENTS

In the following detailed description, numerous specific details are set forth in order to provide a thorough understanding of the invention. However, it will be understood by those skilled in the art that the present invention can be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "activating", "recognizing", "identifying", "selecting", "allocating", "managing" or the like, refer to the action and/or processes of a computer that manipulate and/or transform data into other data, said data represented as physical, such as electronic, quantities and/or said data representing the physical objects. The term "computer" should be expansively construed to cover any kind of electronic system with data processing capabilities, including, by way of non-limiting example, storage system and parts thereof disclosed in the present applications.

The operations in accordance with the teachings herein can be performed by a computer specially constructed for the desired purposes or by a general-purpose computer specially configured for the desired purpose by a computer program stored in a computer readable storage medium.

Embodiments of the present invention are not described with reference to any particular programming language. It will be appreciated that a variety of programming languages can be used to implement the teachings of the inventions as described herein.

The term "criterion" used in this patent specification should be expansively construed to include any compound criterion, including, for example, several criteria and/or their logical combinations.

Figure 1:
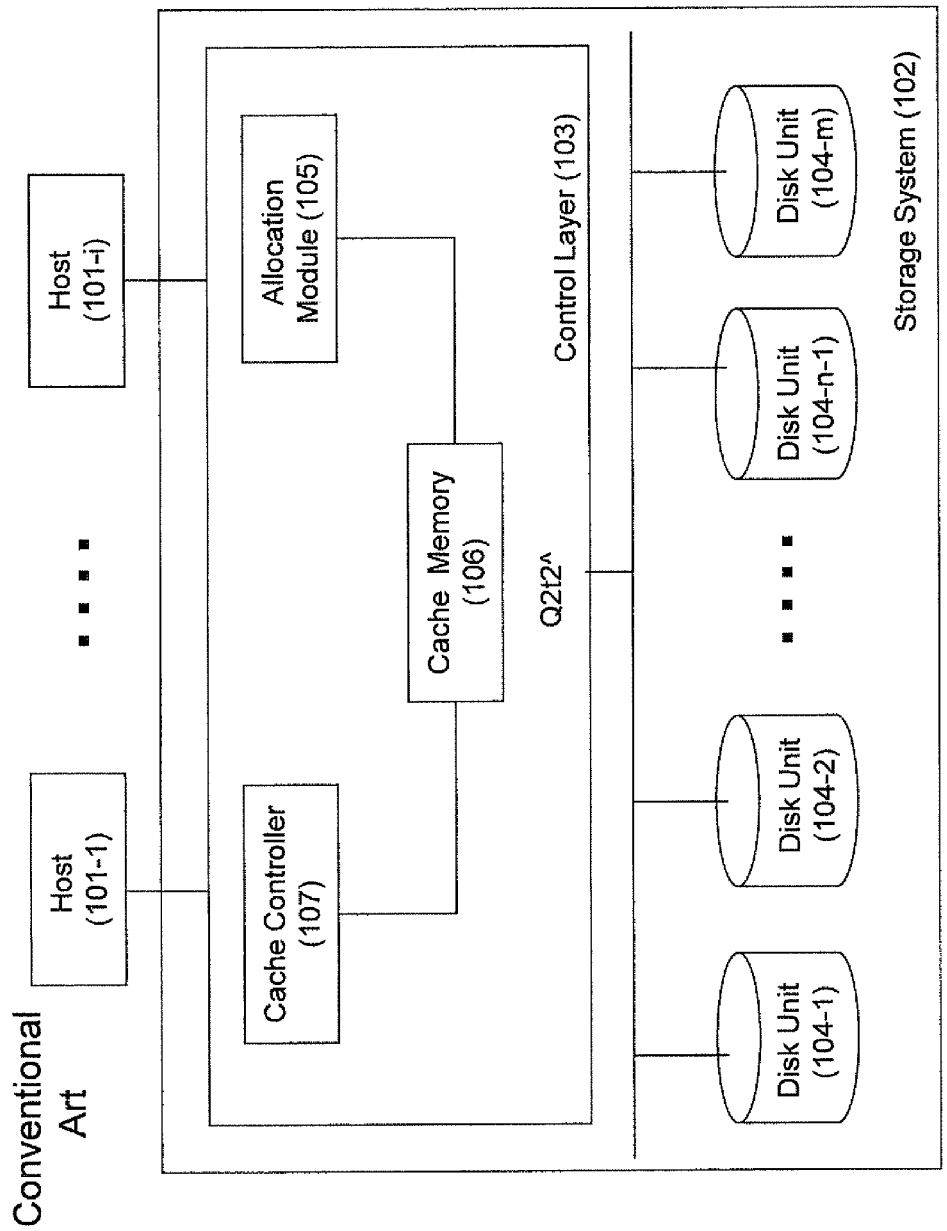
FIG. 1 illustrates a generalized functional block diagram of a mass storage system where the presently disclosed subject matter can be implemented.

Bearing this in mind, attention is drawn to FIG. 1 illustrating an exemplary storage system as known in the art.

The plurality of host computers (workstations, application servers, etc.) illustrated as 101-1-101-n share common storage means provided by a storage system 102. The storage system comprises a plurality of data storage devices 104-1-104-m constituting a physical storage space optionally distributed over one or more storage nodes and a storage control layer 103 comprising one or more appropriate storage control devices operatively coupled to the plurality of host computers and the plurality of storage devices, wherein the storage control layer is operable to control interface operations (including I/O operations) there between. The storage control layer is further operable to handle a virtual representation of physical storage space and to facilitate necessary mapping between the physical storage space and its virtual representation. The virtualization functions can be provided in hardware, software, firmware or any suitable combination thereof. Optionally, the functions of the control layer can be fully or partly integrated with one or more host computers and/or storage devices and/or with one or more communication devices enabling communication between the hosts and the storage devices. Optionally, a format of logical representation provided by the control layer can differ depending on interfacing applications.

The physical storage space can comprise any appropriate permanent storage medium and include, by way of non-limiting example, one or more disk drives and/or one or more disk units (DUs), comprising several disk drives. The storage control layer and the storage devices can communicate with the host computers and within the storage system in accordance with any appropriate storage protocol.

Stored data can be logically represented to a client in terms of logical objects. Depending on storage protocol, the logical objects can be logical volumes, data files, image files, etc. For purpose of illustration only, the following description is provided with respect to logical objects represented by logical volumes. Those skilled in the art will readily appreciate that the teachings of the present invention are applicable in a similar manner to other logical objects.

A logical volume or logical unit (LU) is a virtual entity logically presented to a client as a single virtual storage device. The logical volume represents a plurality of data blocks characterized by successive Logical Block Addresses (LBA) ranging from 0 to a number LUK. Different LUs can comprise different numbers of data blocks, while the data blocks are typically of equal size (e.g. 512 bytes). Blocks with successive LBAs can be grouped into portions that act as basic units for data handling and organization within the system. Thus, for instance, whenever space has to be allocated on a disk or on a memory component in order to store data, this allocation can be done in terms of data portions also referred to hereinafter as "allocation units". Data portions are typically of equal size throughout the system (by way of non-limiting example, the size of a data portion can be 64 Kbytes).

The storage control layer can be further configured to facilitate various protection schemes. By way of non-limiting example, data storage formats, such as RAID (Redundant Array of Independent Discs), can be employed to protect data from internal component failures by making copies of data and rebuilding lost or damaged data. As the likelihood for two concurrent failures increases with the growth of disk array sizes and increasing disk densities, data protection can be implemented, by way of non-limiting example, with the RAID 6 data protection scheme well known in the art.

Common to all RAID 6 protection schemes is the use of two parity data portions per several data groups (e.g. using groups of four data portions plus two parity portions in (4+2) protection scheme), the two parities being typically calculated by two different methods. Under one known approach, all N consecutive data portions are gathered to form a RAID group, to which two parity portions are associated. The members of a group as well as their parity portions are typically stored in separate drives. Under a second known approach, protection groups can be arranged as two-dimensional arrays, typically n*n, such that data portions in a given line or column of the array are stored in separate disk drives. In addition, to every row and to every column of the array a parity data portion can be associated. These parity portions are stored in such a way that the parity portion associated with a given column or row in the array resides in a disk drive where no other data portion of the same column or row also resides. Under both approaches, whenever data is written to a data portion in a group, the parity portions are also updated (e.g. using techniques based on XOR or Reed-Solomon algorithms). Whenever a data portion in a group becomes unavailable (e.g. because of disk drive general malfunction, or because of a local problem affecting the portion alone, or because of other reasons), the data can still be recovered with the help of one parity portion via appropriate known in the art techniques. Then, if a second malfunction causes data unavailability in the same drive before the first problem was repaired, data can nevertheless be recovered using the second parity portion and appropriate known in the art techniques.

The storage control layer can further comprise an Allocation Module 105, a Cache Memory 106 operable as part of the I/O flow in the system, and a Cache Control Module 107, that regulates data activity in the cache and controls destage operations.

The allocation module, the cache memory and/or the cache control module can be implemented as centralized modules operatively connected to the plurality of storage control devices or can be distributed over a part or all storage control devices.

Typically, definition of LUs and/or other objects in the storage system can involve in-advance configuring an allocation scheme and/or allocation function used to determine the location of the various data portions and their associated parity portions across the physical storage medium. Sometimes, as in the case of thin volumes or snapshots, the pre-configured allocation is only performed when a write command is directed for the first time after definition of the volume, at a certain block or data portion in it.

An alternative known approach is a log-structured storage based on an append-only sequence of data entries. Whenever the need arises to write new data, instead of finding a formerly allocated location for it on the disk, the storage system appends the data to the end of the log. Indexing the data can be accomplished in a similar way (e.g. metadata updates can be also appended to the log) or can be handled in a separate data structure (e.g. index table).

Storage devices, accordingly, can be configured to support write-in-place and/or write-out-of-place techniques. In a write-in-place technique modified data is written back to its original physical location on the disk, overwriting the older data. In contrast, a write-out-of-place technique writes (e.g. in a log form) a modified data block to a new physical location on the disk. Thus, when data is modified after being read to memory from a location on a disk, the modified data is written to a new physical location on the disk so that the previous, unmodified version of the data is retained. A non-limiting example of the write-out-of-place technique is the known write-anywhere technique, enabling writing data blocks to any available disk without prior allocation.

When receiving a write request from a host, the storage control layer defines a physical location(s) for writing the respective data (e.g. a location designated in accordance with an allocation scheme, preconfigured rules and policies stored in the allocation module or otherwise and/or location available for a log-structured storage). When receiving a read request from the host, the storage control layer defines the physical location(s) of the desired data and further processes the request accordingly. Similarly, the storage control layer issues updates to a given data object to all storage nodes which physically store data related to said data object. The storage control layer can be further operable to redirect the request/update to storage device(s) with appropriate storage location(s) irrespective of the specific storage control device receiving I/O request.

For purpose of illustration only, the operation of the storage system is described herein in terms of entire data portions. Those skilled in the art will readily appreciate that the teachings of the present invention are applicable in a similar manner to partial data portions.

Certain embodiments of the presently disclosed subject matter are applicable to the storage architecture of a computer system described with reference to FIG. 1. However, the invention is not bound by the specific architecture; equivalent and/or modified functionality can be consolidated or divided in another manner and can be implemented in any appropriate combination of software, firmware and hardware.

Those versed in the art will readily appreciate that the invention is, likewise, applicable to storage architecture implemented as a virtualized storage system. In different embodiments of the presently disclosed subject matter the functional blocks and/or parts thereof can be placed in a single or in multiple geographical locations (including duplication for high-availability); operative connections between the blocks and/or within the blocks can be implemented directly (e.g. via a bus) or indirectly, including remote connection. The remote connection can be provided via Wireline, Wireless, cable, Internet, Intranet, power, satellite or other networks and/or using any appropriate communication standard, system and/or protocol and variants or evolution thereof (as, by way of unlimited example, Ethernet, iSCSI, Fiber Channel, etc.). By way of non-limiting example, the invention can be implemented in a SAS grid storage system disclosed in U.S. patent application Ser. No. 12/544,743 filed on Aug. 20, 2009, assigned to the assignee of the present application and incorporated herein by reference in its entirety.

For purpose of illustration only, the following description is made with respect to RAID 6 architecture. Those skilled in the art will readily appreciate that the teachings of the presently disclosed subject matter are not bound by RAID 6 and are applicable in a similar manner to other RAID technology in a variety of implementations and form factors.

Figure 2:
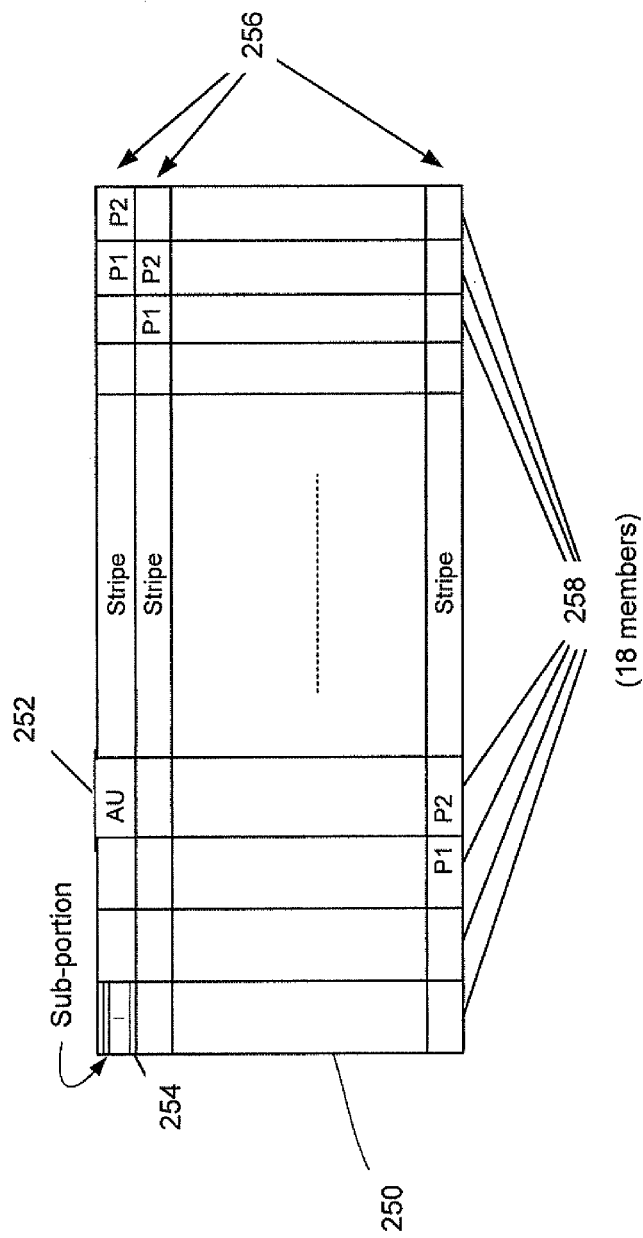
FIG. 2 illustrates a schematic diagram of storage space configured in RAID groups as known in the art.

Referring to FIG. 2, there is illustrated a schematic diagram of storage space configured in RAID groups as known in the art. A RAID group (250) can be built as a concatenation of stripes (256), the stripe being a complete (connected) set of data and parity elements that are dependently related by parity computation relations. In other words, the stripe is the unit within which the RAID write and recovery algorithms are performed in the system. A stripe comprises N+2 data portions (252), the data portions being the intersection of a stripe with a member (256) of the RAID group. A typical size of the data portions is 64 KByte (or 128 blocks). Each data portion is further sub-divided into 16 sub-portions (254) each of 4 Kbyte (or 8 blocks). Data portions and sub-portions (referred to hereinafter also as "allocation units") are used to calculate the two parity data portions associated with each stripe.

Each RG comprises M=N+2 members, MEMi ($0 \leq i \leq N+1$), with N being the number of data portions per RG (e.g. N=16). The storage system is configured to allocate data (e.g. with the help of the allocation module 105) associated with the RAID groups over various physical drives. By way of non-limiting example, a typical RAID group with N=16 and with a typical size of 4 GB for each group member, comprises (4*16=) 64 GB of data. Accordingly, a typical size of the RAID group, including the parity blocks, is of (4*18=) 72 GB.

Figure 3:
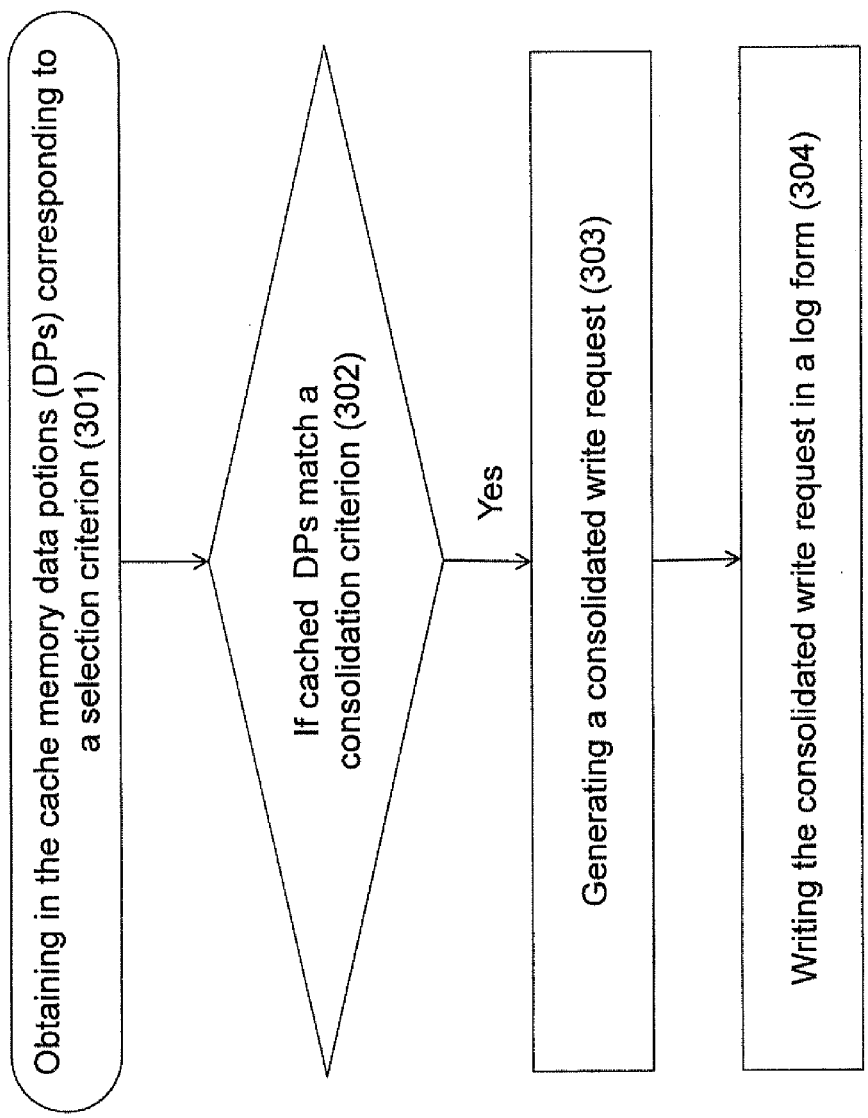
FIG. 3 illustrates a generalized flow-chart of operating the storage system in accordance with certain embodiments of the presently disclosed subject matter.

FIG. 3 illustrates a generalized flow-chart of operating the storage system in accordance with certain embodiments of the presently disclosed subject matter. The cache controller 106 (or other appropriate functional block in the control layer) analyses (302) if data portion(s) obtained (301) in the cache memory and corresponding to a selection criterion (data portions matching a selection criterion are referred to hereinafter as cached data portions) match a predefined consolidation criterion.

By way of non-limiting example, data portions matching the selection criterion can be defined as data portions selected in the cache memory and corresponding to a given write request and data portions from previous write request(s) and cached in the memory at the moment of obtaining the given write request. The data portions matching the selection criterion can further include data portions arising in the cache memory from further write request(s) received during a certain period of time after obtaining the given write request. The period of time may be pre-defined (e.g. 1 second) and/or adjusted dynamically according to certain parameters (e.g. overall workload, level of dirty data in the cache, etc.) related to the overall performance conditions in the storage system. Selection criterion can be further related to different characteristics of data portions (e.g. source of data portions and/or type of data in data portions, etc.)

As will be further detailed with reference to FIGS. 4-6, the consolidation criterion can be related to expected I/O activities with regard to respective data portions and/or groups thereof. (I/O activities can be related to any access requests addresses to respective data portions or to selected types of access requests. By way of non-limiting example, the I/O activities can be considered merely with regard to write requests addressed to respective data portions.) Alternatively or additionally, the consolidation criterion can be related to different characteristics of data portions (e.g. source of data portions and/or type of data in data portions and/or succession of data portions with regard to addresses in the respective logical volume, and/or designated physical location, etc.).

The cache controller consolidates (303) data portions matching the consolidation criterion in a consolidated write request and enables writing (304) the consolidated write request to the disk with the help of any appropriate technique known in the art (e.g. by generating a consolidated write request built of respective data portions and writing the request in the out-of-place technique). Generating and destaging the consolidation write request can be provided responsive to a destage event. The destage event can be related to change of status of allocated disk drives (e.g. from low-powered to active status), to a runtime of caching data portions (and/or certain types of data) in the cache memory, to existence of predefined number of cached data portions matching the consolidation criteria, etc.

Likewise, if at least part of data portions among the cached data portions can constitute a group of N data portions matching the consolidation criterion, where N being the number of data portions per RG, the cache controller consolidates respective data portions in the group comprising N data portions and respective parity portions, thereby generating a destage stripe. The destage stripe is a concatenation of N cached data portions and respective parity portion(s), wherein the size of the destage stripe is equal to the size of the stripe of the RAID group. Those versed in the art will readily appreciate that data portions in the destage stripe do not necessarily constitute a group of N contiguous data portions, and can be consolidated in a virtual stripe (e.g. in accordance with teachings of U.S. patent application Ser. No. 13/008,197 filed on Jan. 18, 2011 assigned to the assignee of the present invention and incorporated herein by reference in its entirety).

Figure 4:
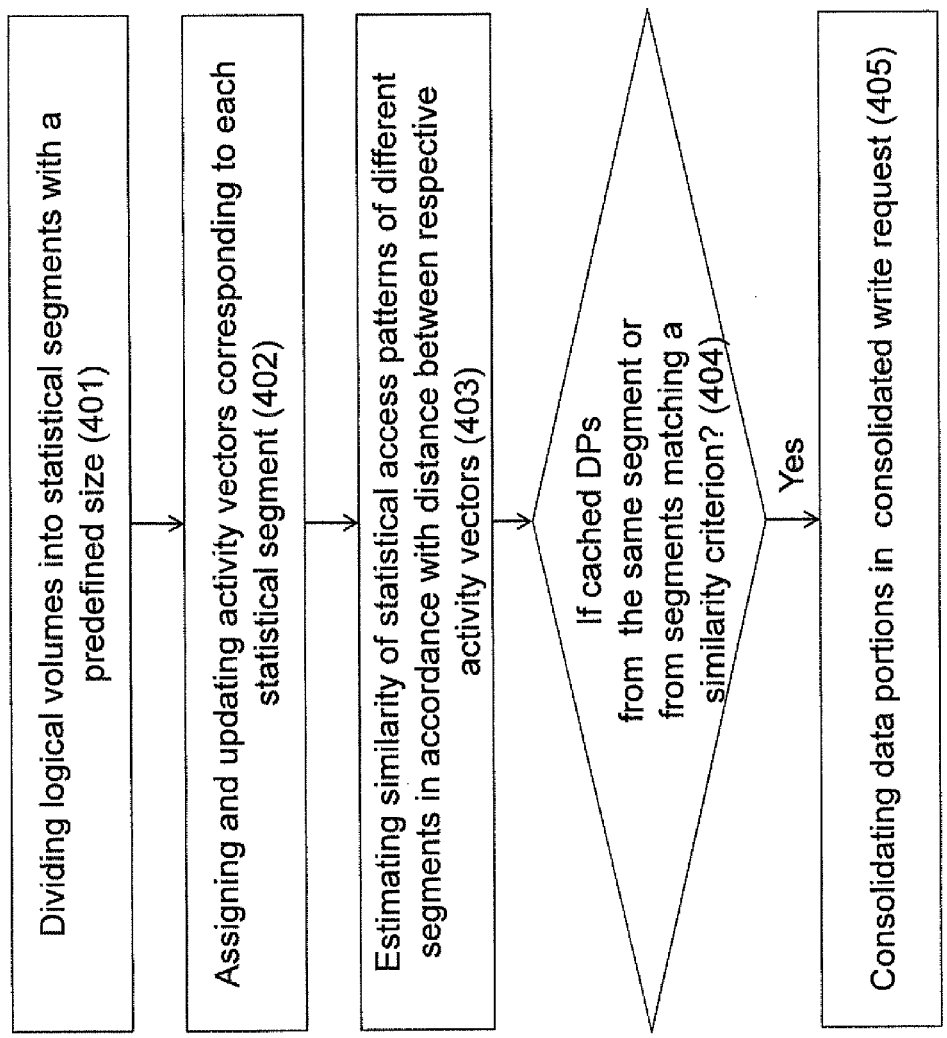
FIG. 4 illustrates a generalized flow-chart of generating a consolidated write request in accordance with certain embodiments of the presently disclosed subject matter.

FIG. 4 illustrates a generalized flow-chart of generating a consolidated write request in accordance with statistical access patterns characterizing the cached data portions and/or groups thereof.

In accordance with certain aspects of the present application, there is provided a technique for identifying data portions with similar expected I/O activity with the help of analyzing statistical access patterns related to the respective data portions. Data portions characterized by similar statistical access patterns (i.e. access patterns based on historical data) are expected to have similar I/O activity also hereinafter. Data portions with similar expected I/O activity are further consolidated in the consolidated write request (optionally, in the destage stripe).

The consolidated write requests comprising data supposed to be frequently used can be handled in the storage system differently from write requests comprising data supposed to be rarely used. Likewise, the physical storage location can be separated in accordance with other criteria of "activity pattern" similarity. By way of non-limiting example, data portions characterized by different expected I/O activity can be stored at different disk drives thereby enabling reduced energy consumption, can be differently addressed by defragmentation and garbage collection background processes, can be differently treated during destage processes, etc. Furthermore, storing data characterized by similar statistical access patterns physically close to each other can provide, for example, performance benefits because of increasing the chances of retaining in the disk cache data that will be read together, reducing seek time in the drive head, etc.

In accordance with certain embodiments of the presently disclosed subject matter, similarity of expected I/O activity can be identified based on I/O activity statistics collected from statistical segments obtained by dividing (401) logical volumes into parts with predefined size (typically comprising a considerable amount of data portions). Data portions within a given statistical segment are characterized by the same statistical access pattern. The statistical access patterns can be characterized by respective activity vectors. The cache control module (or any other appropriate module in the control layer) assigns (402) to each statistical segment an activity vector characterizing statistics of I/O requests addressed to data portions within the segments, wherein values characterizing each activity vector are based on access requests collected over one or more Activity Periods with fixed counting length. The cache control module further updates the values characterizing the activity vectors upon each new Activity Period. A statistical segment can belong to one or more logical volumes. A statistical segment is statistical in the sense that the storage system gathers statistics on its I/O activities.

The size of the statistical segments should be small enough to account for the locality of reference, and large enough to provide a reasonable base for statistics. By way of non-limiting example, the statistical segments can be defined of size 1 GB, and the "activity vector" characterizing statistics related to each given segment can be defined of size 128 bits (8*16). All statistical segments can have equal predefined size. Alternatively, the predefined size of statistical segment can vary depending on data type prevailing in the segment or depending and/or application(s) related to the respective data, etc.

In accordance with certain embodiments of the currently presented subject matter, two or more statistical segments are considered as having similar statistical access patterns if the distance between respective activity vectors matches a predefined similarity criterion, as will be further detailed with reference to FIG. 5.

FIG. 5 illustrates a non-limiting example of an activity vector structure. The cache controller 106 (or other appropriate functional block) collects statistics from a given statistical segment with regard to a respective activity vector over activity periods with fixed counting length (e.g. 4 hours).

Within a given Activity Period, I/O activity is counted with fixed granularity intervals, i.e. all access events during the granularity interval (e.g., 1-2 minutes) are counted as a single event. Granularity intervals can be dynamically modified in the storage system, for example making it to depend on the average lifetime of an element in the cache. Access events can be related to any access request addressed to respective data portions, or to selected types of access requests (e.g. merely to write requests).

Activity Counter (501) value characterizes the number of accesses to data portions in the statistical segment in a current Activity Period. A statistical segment is considered as an active segment during a certain Activity Period if during this period the activity counter exceeds a predefined activity threshold for this period (e.g. 20 accesses). Likewise, an Activity Period is considered as an active period with regard to a certain statistical segment if during this period the activity counter exceeds a predefined activity threshold for this certain statistical segment. Those versed in the art will readily appreciate that the activity thresholds can be configured as equal for all segments and/or Activity Periods. Alternatively, the activity thresholds can differ for different segments (e.g. in accordance with data type and/or data source and/or data destination, etc. comprised in respective segments) and/or for different activity periods (e.g. depending on a system workload). The activity thresholds can be predefined and/or adjusted dynamically.

Activity Timestamp (502) value characterizes the time of the first access to any data portion in the segment within the current Activity Period or within the last previous active Activity Period if there are no accesses to the segment in the current period. Activity Timestamp is provided for granularity intervals, so that it can be stored in a 16-bit field.

Activity points-in-time values t1 (503), t2 (504), t3 (505) indicate time of first accesses within the last three active periods of the statistical segment. Number of such points-in-time is variable in accordance with the available number of fields in the activity vector and other implementation considerations.

Waste Level (506), Defragmentation Level (507) and Defragmentation Frequency (508) are optional parameters to be used for frequency—dependent defragmentation processes. These fields are illustrates in U.S. patent application Ser. No. 13/270,725 filing date Oct. 10, 2010 which is incorporated herein by reference.

The following explanation will shed some light on various embodiments of the Waste Level (506), Defragmentation Level (507) and Defragmentation Frequency (508) fields.

Defragmentation may be implemented as a background process that reads existing stripes on the drives and re-writes them in a way that improves the data layout in the system. Such an improvement may include reducing the size of the tree, and increasing the number of sequential stripes in the VUA that are sequentially mapped to the VDA (and this may be obtained with an optimal length of (for example) 4 consecutive stripes).

Defragmentation evidently incurs a negative impact on overall performance and hence we introduce mechanisms for reducing this negative impact. At the same time, it is important to notice that defragmentation may enlarge, rather than reduce, the physical space allocated to data. Two possible cases of this are:

a. Gaps due to data not written: take, for example the case in which 4 out of 14 sections in a logical stripe have not been written by the host thus far. The defragmentation process may identify the 10 already written sections and read them into cache. In order to complete the stripe it will have to add 4 sections of pure zeroes and store them on the drives (and the sections will not be pointed at via the tree). At the end of the process, 14 sections will have been used in the drives for this stripe, whereas before it, only 10 sections had been allocated.

b. Data associated with snapshots: take, for example, a stripe of 14 sections that are sequential in the VUA, and that belong to a volume V on which a snapshot S has been performed. At this point all sections are common, and 14 physical sections stored on the drives suffice to contain the data associated with both the 14 sections of V and the 14 sections of S (which are the same).

Assume now that a single section in the stripe, say SEC6, is modified and let SEC6' be the modified section. SEC6' will be written to a different destage stripe and stored at a different location. Only the corresponding section in the snapshot S will continue to point to the original value SEC6. Other than that, all the other sections will still be pointed commonly by V and by S. So at this point, these logical sections, 14 of V and 14 of S, are stored as 15 physical sections (13 common for the non-modified, and 1+1 for the modified sections).

Now, the defragmentation process is performed on the volume V, and when it reaches this stripe, it will notice that it is fragmented, since SEC6' is stored at a different place. Hence it will read into cache the 13 original sections from their original location and SEC6' from their own location in order to produce a new defragmented stripe for V. At the same time, however, the 14 original sections need to remain in their original location, as they represent the contents of the sections for S.

Thus, at this point the logical sections associated with V and with S will be stored separately in 14+14 physical sections, rather than in 15, as they were before defragmentation. Additional examples could be given here. For instance, just to give an extreme scenario, if V is copied into three snapshot, S1, S2, S3, and SEC6 is modified in V and in each of the snapshots, thus yielding SEC6, SEC6'1, SEC6'2, and SEC6'3, then before defragmentation we will have 14+3 sections stored in the drives, and defragmentation may lead to four stripes and 14*4 sections stored in the disks.

These two examples show how defragmentation may lead to an increase in physical storage usage rather than a reduction of it. However, it must be kept in mind that our system allocates space at the section level (i.e., 64 KB) while most other vendors allocated at much larger units (e.g., 1 MB). Thus, in the end even with these cases, our overall usage of storage space is highly efficient. We can hit an adequate balance between the spaces used in RAM to the necessary metadata and the space used in the drives Statistics Usage for Defragmentation: The defragmentation mechanism makes use of the information provided by the activity vector defined for each segment as part of the Multi-Modal Destage mechanism.

The last three fields are added to the vector specifically for this purpose, as follows:

a. Waste Level (506): how many sections will be added in the disks when defragmenting the entire segment. Thus, for instance, if in the segment we have one stripe as in example (A) above, then this stripe contributes with 4 to the Waste Level. In example (B), the waste level contributed by this stripe is 13 (i.e., (14*2)−(14+1)), which is the number of sections added in the drives after defragmentation. And in the extreme case mentioned at the end of example (B), we would have a waste level of 39 (i.e., (14*4)−(14+3)).

b. Defragmentation Level (507): how many non-sequential stripes are in the segment.

c. Defragmentation Frequency (508): when was the segment defragmented for the last time (measured in days).

The cache controller updates the values of Activity Counter (501) and Activity Timestamp (502) in an activity vector corresponding to a segment SEG as follows:

a. responsive to accessing a data portion $DP_s$ in the segment SEG at a granularity interval T, if 0<(T−Activity Timestamp)≤counting length of Activity Period (i.e. the segment SEG has already been addressed in the present activity period), the cache controller increases the value of Activity Counter by one, while keeping the value of Activity Timestamp unchanged;
b. if (T−Activity Timestamp)>counting length of Activity Period, the cache controller resets the Activity Counter and starts counting for a new activity period, while T is set as a new value for Activity Timestamp.

Those versed in the art will readily appreciate that the counting length of an Activity Period characterizes the maximal time between the first and the last access requests to be counted within an Activity Period. The counting length can be less than the real duration of the Activity Period.

Before resetting the Activity Counter, the cache controller checks if the current value of the Activity Counter is more than a predefined Activity Threshold. Accordingly, if the segment has been active in the period preceding the reset, activity points-in-time values t1 (503), t2 (504) and t3 (505) are updated as follows:
the value of t2 becomes the value of t3; the value of t1 becomes the value of t2; the value of t1 becomes equal to T (the updated Activity Timestamp). If the current value of Activity Counter before reset is less than the predefined Activity Threshold, values t1 (503), t2 (504), t3 (505) are kept without changes.

Thus, at any given point in time, the activity vector corresponding to a given segment characterizes:
a. the current level of I/O activity associated with the given segment (the value of Activity Counter);
b. The time (granularity interval) of the first I/O addressed at the segment in the current activity period (the value of Activity Timestamp) and in previous activity periods (values of t1, t2, t3) when the segment was active.

Optionally, the activity vector can further comprise additional statistics collected for special kinds of activity, e.g., reads, writes, sequential, random, etc.

In accordance with certain aspects of subject matter of the present application, data portions with similar statistical access patterns can be identified with the help of a "distance" function calculation based on the activity vector (e.g. values of parameters (t1, t2, t3) or (parameters Activity Timestamp, t1, t2, t3)). The distance function allows sorting any given collection of activity vectors according to proximity with each other.

The exact expression for calculating the distance function can vary from storage system to storage system and, through time, for the same storage system, depending on typical workloads in the system. By way of non-limiting example, the distance function can give greater weight to the more recent periods, characterized by values of Activity Timestamp and by t1, and less weight to the periods characterized by values t2 and t3. By way of non-limiting example, the distance between two given activity vectors V, V' can be defined as $d(V,V')=|t1-t'1|+(t2-t'2)^2+(t3-t'3)^2$.

Two segments SEG, SEG' with activity vectors V,V' can be defined as "having a similar statistical access pattern" if $d(V, V')<B$, where B is a similarity criterion. The similarity criterion can be defined in advance and/or dynamically modified according to global activity parameters in the system.

Those skilled in the art will readily appreciate that the distance between activity vectors can be defined by various appropriate ways, some of them known in the art. By way of non-limiting example, the distance can be defined with the help of techniques developed in the field of cluster analyses, some of them disclosed in the article "Distance-based cluster analysis and measurement scales", G. Majone, Quality and Quantity, Vol. 4 (1970), No. 1, pages 153-164.

Referring back to FIG. 4, the cache control module estimates (403) similarity of statistical access patterns of different statistical segments in accordance with a distance between respective activity vectors. The statistical segments are considered matching a similarity criterion if the calculated distance between respective activity vectors is less than a predefined similarity threshold. The cached data portions are defined as matching the consolidation criterion if they belong to the same segment or to the segments matching the similarity criterion. Optionally, the consolidation criterion can further include other requirements, besides matching the similarity criterion.

In certain embodiments of the presently disclosed subject matter, the distances can be calculated between all activity vectors, and all calculated distances can be further updated responsive to any access request. Alternatively, responsive to an access request, the distances can be calculated only for activity vectors corresponding to the cached data portions as further detailed with reference to FIG. 6.

Those versed in the art will readily appreciate that the invention is, likewise, applicable to other appropriate ways of distance calculation and updating.

The cache controller further checks (404) if there are cached data portions matching the consolidation criterion and consolidates (405) respective data portions in the consolidated write request. If at least part of data portions among the cached data portions can constitute a group of N data portions matching the consolidation criterion, the cache controller can consolidate respective data portions in the destage stripe. Optionally, data portions can be ranked in accordance with a level of similarity, and consolidation can be provided in accordance with such ranking (e.g. data portions from the same statistical segments would be preferable for consolidation in the write request).

Figure 6:
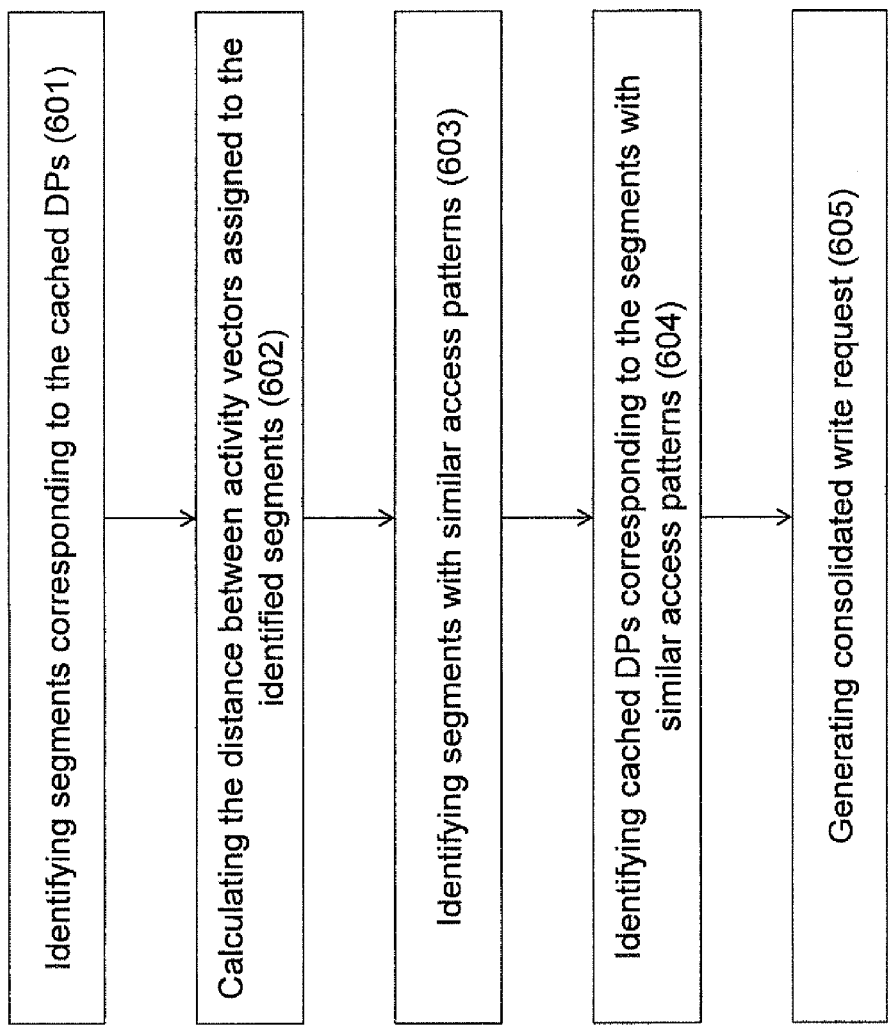
FIG. 6 illustrates a generalized flow-chart of an exemplified embodiment of generating a consolidated write request in accordance with the presently disclosed subject matter.

FIG. 6 illustrates a generalized flow-chart of generating a consolidated write request responsive to an obtained write request in accordance with the currently presented subject matter. Responsive to an obtained write request, the cache control module identifies (601) segments corresponding to the cached data portions, calculates (602) the distances between activity vectors assigned to the identified segments and identifies (603) segments with similar statistical access patterns. The cache control module further identifies (604) cached data portions corresponding to the identified segments with similar access patterns, consolidates (605) respective data portions into a consolidated write request and enables writing the consolidated write request in a log form (or with the help of any appropriate technique known in the art). Generating the consolidation write request and/or writing thereof can be provided responsive to a destage event.

Figure 7:
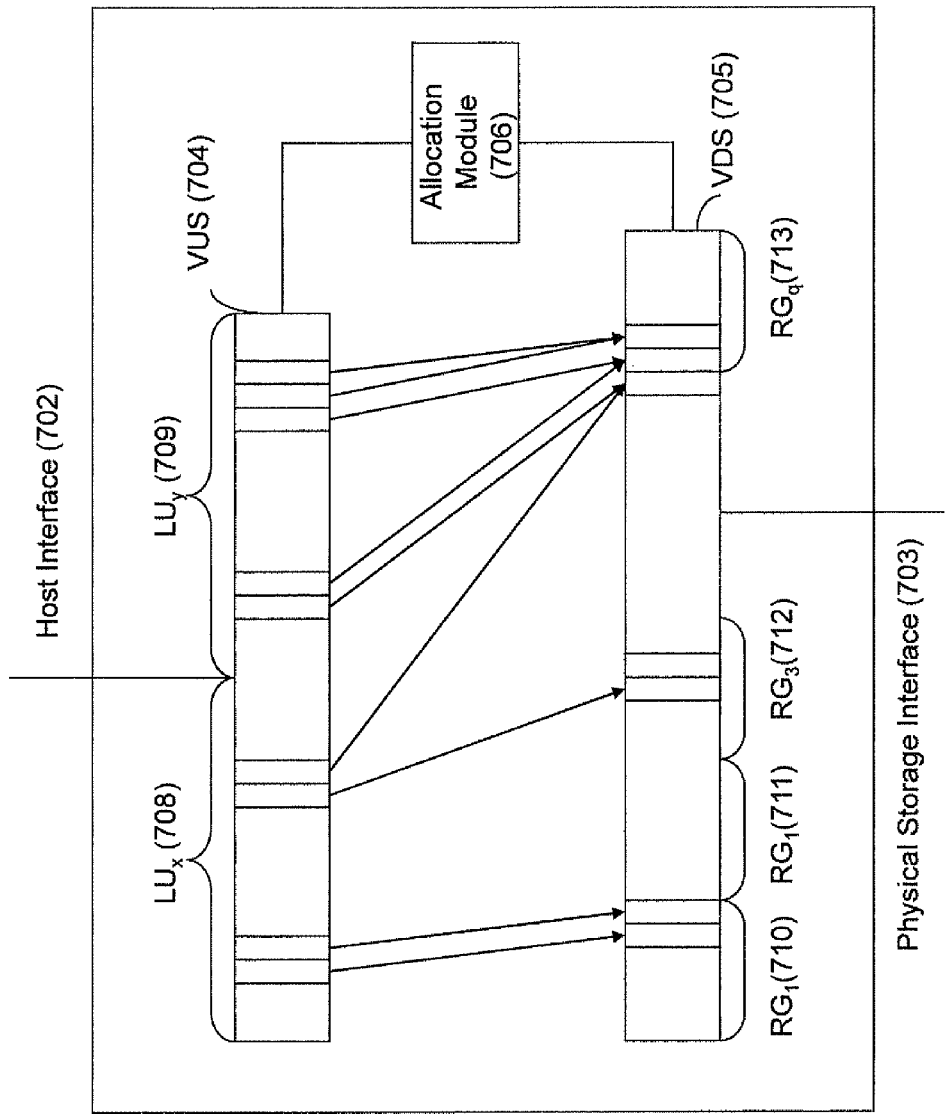
FIG. 7 illustrates a schematic functional diagram of the control layer where the presently disclosed subject matter can be implemented.

Referring to FIG. 7, there is illustrated a schematic functional diagram of a control layer configured in accordance with certain embodiments of the presently disclosed subject matter. The illustrated configuration is further detailed in U.S. patent application Ser. No. 13/008,197 filed on Jan. 18, 2011 assigned to the assignee of the present invention and incorporated herein by reference in its entirety.

The virtual presentation of the entire physical storage space can be provided through creation and management of at least two interconnected virtualization layers: a first virtual layer 704 interfacing via a host interface 702 with elements of the computer system (host computers, etc.) external to the storage system, and a second virtual layer 705 interfacing with the physical storage space via a physical storage interface 703. The first virtual layer 704 is operative to represent logical units available to clients (workstations, applications servers, etc.) and is characterized by a Virtual Unit Space (VUS). The logical units are represented in VUS as virtual data blocks characterized by virtual unit addresses (VUAs). The second virtual layer 705 is operative to represent the physical storage space available to the clients and is characterized by a Virtual Disk Space (VDS). By way of non-limiting example, storage space available for clients can be calculated as the entire physical storage space less reserved parity space and less spare storage space. The virtual data blocks are represented in VDS with the help of virtual disk addresses (VDAs). Virtual disk addresses are substantially statically mapped into addresses in the physical storage space. This mapping can be changed responsive to modifications of physical configuration of the storage system (e.g. by disk failure of disk addition). The VDS can be further configured as a concatenation of representations (illustrated as 710-713) of RAID groups.

The first virtual layer (VUS) and the second virtual layer (VDS) are interconnected, and addresses in VUS can be dynamically mapped into addresses in VDS. The translation can be provided with the help of the allocation module 706 operative to provide translation from VUA to VDA via Virtual Address Mapping. By way of non-limiting example, the Virtual Address Mapping can be provided with the help of an address trie detailed in U.S. application Ser. No. 12/897,119 filed Oct. 4, 2010, assigned to the assignee of the present application and incorporated herein by reference in its entirety.

By way of non-limiting example, FIG. 7 illustrates a part of the storage control layer corresponding to two LUs illustrated as LUx (708) and LUy (709). The LUs are mapped into the VUS. In a typical case, initially the storage system assigns to a LU contiguous addresses (VUAs) in VUS. However, existing LUs can be enlarged, reduced or deleted, and some new ones can be defined during the lifetime of the system. Accordingly, the range of contiguous data blocks associated with the LU can correspond to non-contiguous data blocks assigned in the VUS. The parameters defining the request in terms of LUs are translated into parameters defining the request in the VUAs, and parameters defining the request in terms of VUAs are further translated into parameters defining the request in the VDS in terms of VDAs and further translated into physical storage addresses.

Translating addresses of data blocks in LUs into addresses (VUAs) in VUS can be provided independently from translating addresses (VDA) in VDS into the physical storage addresses. Such translation can be provided, by way of non-limiting examples, with the help of an independently managed VUS allocation table and a VDS allocation table handled in the allocation module 706. Different blocks in VUS can be associated with one and the same block in VDS, while allocation of physical storage space can be provided only responsive to destaging respective data from the cache memory to the disks (e.g. for snapshots, thin volumes, etc.).

Figure 8:
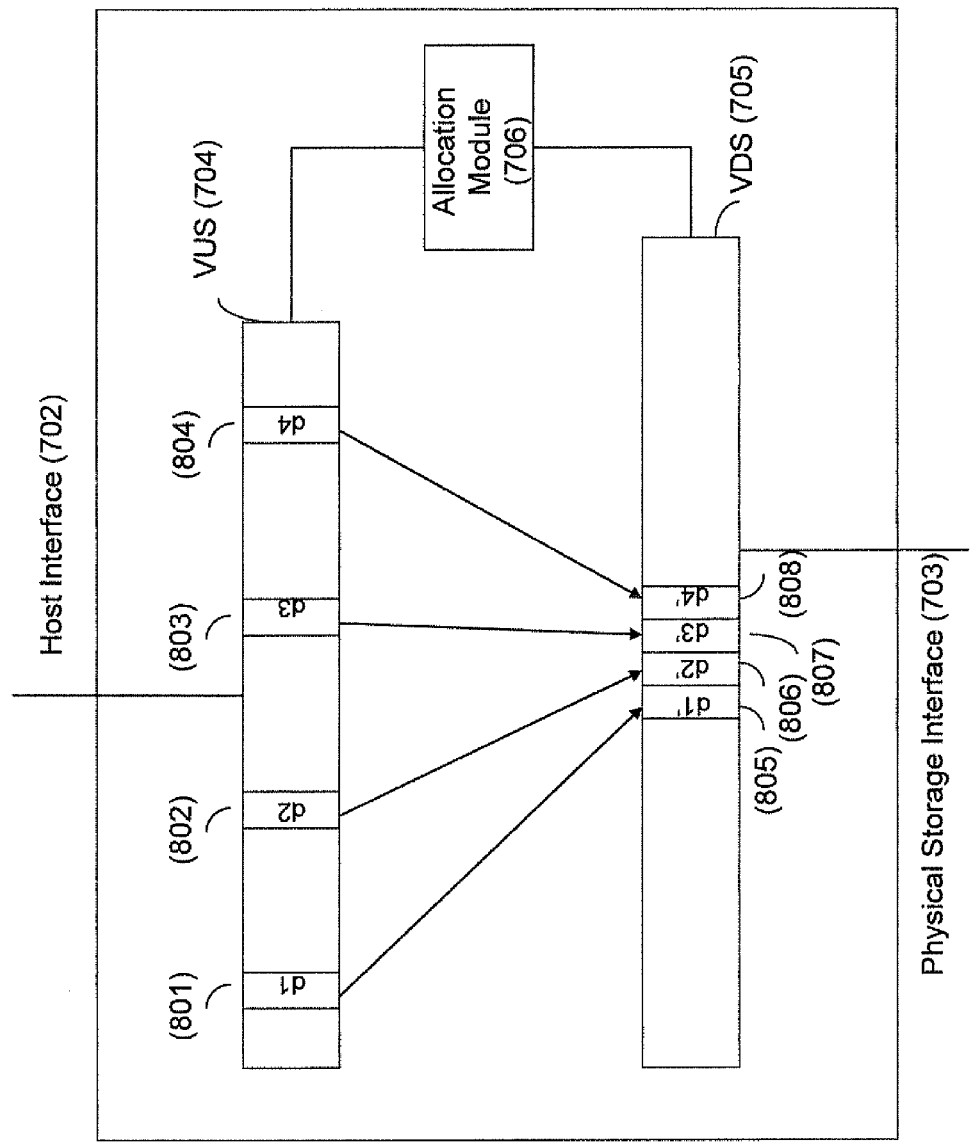
FIG. 8 illustrates a schematic diagram of generating a consolidated write request in accordance with certain embodiments of the presently disclosed subject matter.

Referring to FIG. 8, there is illustrated a schematic diagram of generating a consolidated write request with the help of a control layer illustrated with reference to FIG. 7. As illustrated by way of non-limiting example in FIG. 8, non-contiguous cached data portions d1-d4 corresponding to one or more write requests are represented in VUS by non-contiguous sets of data blocks 801-804. VUA addresses of data blocks (VUA, block_count) correspond to the received write request(s) (LBA, block_count). The control layer further allocates to the data portions d1-d4 virtual disk space (VDA, block_count) by translation of VUA addresses into VDA addresses. When generating a consolidated write request (e.g. a destage stripe) comprising data portions d1-d4, VUA addresses are translated into sequential VDA addresses so that data portions become contiguously represented in VDS (805-808). When writing the consolidated write request to the disk, sequential VDA addresses are further translated into physical storage addresses. For example, in a case of the destage stripe, sequential VDA addresses are further translated into physical storage addresses of respective RAID group statically mapped to VDA. Write requests consolidated in more than one stripe can be presented in VDS as consecutive stripes of the same RG.

Likewise, the control layer illustrated with reference to FIG. 8 can enable recognition by a background (e.g. defragmentation) process non-contiguous VUA addresses of data portions, and further translating such VUA addresses into sequential VDA addresses so that data portions become contiguously represented in VDS when generating a respective consolidated write request.

By way of non-limiting example, allocation of VDA for the destage stripe can be provided with the help of a VDA allocator (not shown) comprised in the allocation block or in any other appropriate functional block.

Typically, a mass storage system comprises more than 1000 RAID groups. The VDA allocator is configured to enable writing the generated destage stripe to a RAID group matching predefined criteria. By way of non-limiting example, the criteria can be related to classes assigned to the RAID groups, each class characterized by expected level of I/O activity with regard to accommodated data.

The VDA allocator is configured to select RG matching the predefined criteria, to select the address of the next available free stripe within the selected RG and allocate VDA addresses corresponding to this available stripe. Selection of RG for allocation of VDA can be provided responsive to generating the respective destage stripe to be written and/or as a background process performed by the VDA allocator.

According to an embodiment of the invention I/O activity statistics of one or more statistical segments can be collected and can assist in pre-fetching. The pre-fetching can be responsive to I/O activity statistics that may include timing information of I/O activities, frequency information of I/O activities and may also include information about the type of I/O operations that constitute the I/O activities.

The I/O activity statistics can provide an indication about an I/O activity level of a statistical segment.

I/O activity statistics can be represented by an activity vector or any other data structure.

According to an embodiment of the invention I/O activity statistics can represent I/O activity patterns that differ from a sequential class and a random class. As indicated above, the I/O activity statistics can include richer information such as but not limited to timing information (fields 502-505) or number of I/O activities per period (field 501).

A pre-fetch operation is usually triggered by a fetch operation. The fetch operation may involve fetching a certain data portion (that may have been requested by a host computer). The amount and additionally or alternatively, the identities of data portions to be pre-fetched can be responsive to the I/O activity level (or any other characteristic of the I/O activity statistics) of the statistical segment that includes that certain data portion and may also be made to depend on global IO activity levels of the entire system at a given point in time (i.e., if the storage systems is very busy then the storage system performs less pre-fetch operations or no pre-fetch operation at all, if activity in the cache memory is slow—data remains for longer times.

Data portions may belong to statistical segments that may be classified to an I/O activity level class out of two or more I/O activity level classes. For example, a statistical segment (or data portions of that statistical segment) can be classified as cold (passive or low I/O activity level) or hot (active or low I/O activity level).

It may be assumed that a request to fetch a certain data portion that is classified as cold will be followed by requests to fetch additional data portions that are also cold and are presumably associated with that certain data portion. The association between the certain data portion and the additional data portions can be learnt based upon the I/O activity statistics relevant statistical segments. In this case the certain data portion can be fetched and the additional cold data portions should be pre-fetched.

According to various embodiments of the invention, once a certain data portion is requested by a host computer and the control layer determines to fetch that certain data portion from a data storage device to the cache memory then the control layer can pre-fetch one or more additional data portions—from the same statistical segment as the certain data portion or from one or more additional statistical segments.

The one or more additional data portions that are pre-fetched can belong to the same statistical segment as the certain data portion, to one or more statistical data segments that differ from the statistical segment of the certain data segment or a combination thereof.

The combination of fetch and pre-fetch operations can result in retrieving (a) a part of a statistical segment, (b) an entire statistical segment, or (c) more than a single statistical segment.

The determination of which data portions to pre-fetch (if any) can be (a) applied regardless of the relevant statistical segment, or can be (b) dependent upon the relevant statistical segments. A relevant statistical segment is a statistical segment that includes one or more data portions that is either fetched or is intended to be pre-fetched. Accordingly, a statistical segment dependent pre-fetch policy can be applied.

According to an embodiment of the invention the determination of which data portions to pre-fetch can be responsive to one or more logical volumes that include one or more data portions that are either fetched or pre-fetched. Accordingly, a logical volume dependent pre-fetch policy can be applied.

According to various embodiments of the invention the determination of which data portions to pre-fetch can be responsive of a status of the storage system—such as the load imposed on the storage system (busier storage systems may prefer to limit the amount of pre-fetched data portions), load balancing considerations, cost (in terms of time, resources, bandwidth) of pre-fetching and the like.

According to an embodiment of the invention the I/O activity level of a statistical segment can be classified to two or more levels. For example, a statistical segment can be classified as being passive (cold) or active (hot).

Yet for another example, a statistical segment can be classified as being passive, semi-passive, semi-active or active.

It is noted that the I/O activity level of a statistical segment can be classified to N different levels, wherein N exceeds one and may exceed four.

The I/O activity level of a statistical segment can be responsive to the frequency of I/O activity, to the timing of the last some I/O activities related to that statistical segment, to the amount of data transferred during the last one or more I/O operations, to the type of I/O activity (read, write, destage) or a combination thereof.

Referring to the example, set forth in FIG. 5, the I/O activity level of a statistical segment can be determined based upon a content of one or more fields of the activity vector-activity counter (501), activity timestamp (502), activity points-in-time values t1 (503), t2 (504) and t3 (505), waste level (506), defragmentation level (507) and defragmentation frequency (508).

For example, a statistical segment can be classified as cold if all activity points-in-time values 503-505 are zero (indicative of a lack of I/O activity in the respective periods), or if at least one or two of the activity points-in-time values 503-505 are zero. Yet for another example, a statistical segment can be classified as cold is one or more of the activity points-in-time values 503-505 are zero and if the I/O activity operations (if such existed during at least one of points in time t1, t2 and t3) differ from read operations.

Yet for a further example, it may be useful to pre-fetch data portions from highly fragmented statistical segments. The value of the defragmentation level field (507) and, additionally or alternatively, of the defragmentation frequency field (508) can assist in determining whether to pre-fetch one or more data portions from the statistical segment that is characterized by these fields.

Figure 9:
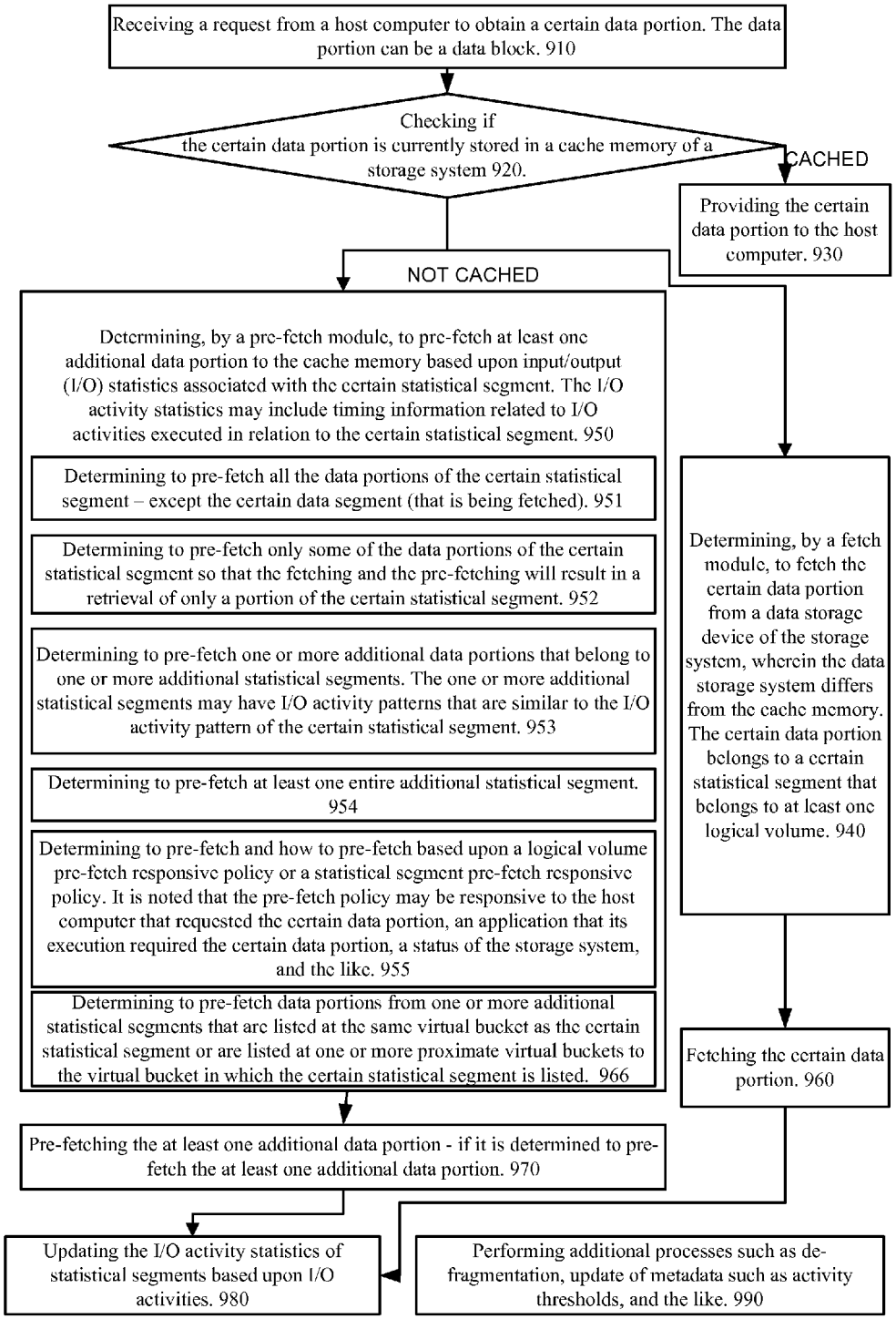
FIG. 9 illustrates a method for pre-fetching according to an embodiment of the invention.

FIG. 9 illustrates a method 900 according to an embodiment of the invention.

Method 900 may start by stage 910 of receiving a request from a host computer to obtain a certain data portion. The data portion can be a data block.

Stage 910 may be followed by stage 920 of checking if the certain data portion is currently stored in a cache memory of a storage system.

If it is determined that the certain data portion is stored in the cache memory then stage 920 is followed by stage 930 of providing the certain data portion to the host computer.

If it is determined that the certain data portion is not stored in the cache memory then stage 920 is followed by stages 940 and 950.

Stage 940 may include determining, by a fetch module of the storage system, to fetch the certain data portion from a data storage device of the storage system, wherein the data storage system differs from the cache memory. The certain data portion belongs to a certain statistical segment that belongs to at least one logical volume.

Stage 940 is followed by stage 960 of fetching the certain data portion.

Stage 950 includes determining, by a pre-fetch module of the storage system, to pre-fetch at least one additional data portion to the cache memory based upon I/O activity statistics associated with the certain statistical segment. The I/O activity statistics may include timing information related to I/O activities executed in relation to the certain statistical segment.

The I/O activity statistics may represent a frequency of I/O activities, types of I/O activities or a combination thereof. The I/O activities statistics can be represented by an activity vector or by other data structures The determining of stage 950 may be responsive to the I/O activities level of the certain statistical segment. For example, stage 950 may include at least one of the following:
  a. Determining, by the pre-fetch module, to pre-fetch the at least one additional data portion of the certain statistical segment to the cache memory if an I/O activity level associated with the certain statistical segment is below an activity threshold.
  b. Determining, by the pre-fetch module, to pre-fetch at least one additional data portion of the certain statistical segment to the cache memory if an I/O activity level associated with the certain statistical segment is above an activity threshold.

c. Determining, by the pre-fetch module, to pre-fetch the at least one additional data portion of the certain statistical segment to the cache memory if an I/O activity level associated with the certain statistical segment belongs to a certain range of I/O activity levels out of multiple different I/O activity levels.

d. Determining, by the pre-fetch module, not to pre-fetch the at least one additional data portion of the certain statistical segment if the I/O activity level associated with the certain statistical segment is above the activity threshold.

e. Determining, by the pre-fetch module, not to pre-fetch the at least one additional data portion of the certain statistical segment if the I/O activity level associated with the certain statistical segment is below the activity threshold.

Stage 950 can include at least one of stages 951, 952, 953, 954 and 955.

Stage 951 may include determining to pre-fetch all the data portions of the certain statistical segment—except the certain data segment (that is being fetched).

Stage 952 may include determining to pre-fetch only some of the data portions of the certain statistical segment so that the fetching and the pre-fetching will result in a retrieval of only a portion of the certain statistical segment.

Stage 953 may include determining to pre-fetch one or more additional data portions that belong to one or more additional statistical segments. The one or more additional statistical segments may have I/O activity patterns that are similar to the I/O activity pattern of the certain statistical segment.

Stage 954 may include determining to pre-fetch at least one entire additional statistical segment.

At least one of stages 953 and 954 may be responsive to the I/O activity pattern of one or more additional statistical segment.

Stage 955 of determining to pre-fetch and how to pre-fetch based upon a logical volume pre-fetch responsive policy or a statistical segment pre-fetch responsive policy. It is noted that the pre-fetch policy may be responsive to the host computer that requested the certain data portion, an application that its execution required the certain data portion, a status of the storage system, and the like.

At least one of stages 953 and 954 may be responsive to the I/O activity pattern of one or more additional statistical segment.

Stage 955 of determining to pre-fetch and how to pre-fetch based upon a logical volume pre-fetch responsive policy or a statistical segment pre-fetch responsive policy. It is noted that the pre-fetch policy may be responsive to the host computer that requested the certain data portion, an application that its execution required the certain data portion, a status of the storage system, and the like.

Stage 950 is followed by stage 970 of pre-fetching the at least one additional data portion—if it is determined to pre-fetch the at least one additional data portion.

Thus, according to the determination of stage 950, stage 970 may include at least one out of:

a. Pre-fetching all the data portions of the certain statistical segment—except the certain data segment (that is being fetched).

b. Pre-fetching only some of the data portions of the certain statistical segment so that the fetching and the pre-fetching will result in a retrieval of only a portion of the certain statistical segment.

c. Pre-fetching one or more additional data portions that belong to one or more additional statistical segments.

The one or more additional statistical segments may have I/O activity patterns that are similar to the I/O activity pattern of the certain statistical segment.

d. Pre-fetching at least one entire additional statistical segment.

It is noted that method 900 can include additional stages such as stages 980 and 990.

Stage 980 may include updating the I/O activity statistics of statistical segments based upon I/O activities.

Stage 980 may be preceded by any one of stages 920, 930, 960 and 970.

Stage 990 may include performing additional processes such as defragmentation, update of metadata such as activity thresholds, and the like.

According to an embodiment of the invention the pre-fetching can be responsive to the timing of the last I/O activity related to the certain statistical segment that includes the certain data portion and may be responsive to the timing of the last I/O activity level of one or more additional statistical segments. Thus, the pre-fetching can involve pre-fetching one or more data portions from one or more additional statistical segments that were accessed during the same time (or the same time interval) as the certain statistical segment. Such one or more additional statistical segments can be located using metadata in the form of virtual buckets.

Timing information is used for sorting statistical segments based upon the time they were accessed. There may be provided multiple virtual buckets wherein each virtual bucket is associated with a time interval and includes references to statistical segments that were accessed during that time interval.

For example, a first virtual bucket may include references to statistical segments that were accessed during the present time interval, e.g. the last hour. This first virtual bucket may be referred to as a recent virtual bucket.

A second virtual bucket may include references to statistical segments that were accessed during a previous time interval, e.g. the hour that precedes the last hour, and the j'th virtual bucket may include references to statistical segments that were accessed during the j'th oldest time internal. Index j may exceed two.

The virtual buckets may include timing information about the last timing interval during which each statistical segment was accessed so that if a certain statistical segment is accesses any reference to that certain statistical segment in any older virtual bucket is deleted.

It is noted that the virtual buckets can represent time intervals of equal length or of unequal length. Although timing intervals of one hour were mentioned above the virtual buckets can be allocated to time intervals that differ from one hour intervals.

The virtual buckets can be managed in a cyclic manner. When the recent time interval elapsed (e.g. at the end of the hour) the statistical segments references from the n'th virtual bucket are appended to the (j−1)'th virtual bucket, which becomes the new j'th virtual bucket and so as to utilize the previous j'th virtual bucket as the recent virtual bucket, i.e. virtual bucket 1.

If there is a need to access the coldest statistical segments, these statistical segments can be retrieved from the oldest virtual bucket. If there is a need to access the hottest statistical segments, these statistical segments can be retrieved from the first virtual bucket. If a certain level of coldness is needed, then the address references from the respective virtual bucket can be retrieved—as the j virtual buckets represent j levels of coldness.

Method 900 can include stage 956 of determining to pre-fetch data portions from one or more additional statistical segments that are listed at the same virtual bucket as the certain statistical segment or are listed at one or more proximate virtual buckets to the virtual buckets in which the certain statistical segment is listed.

It is noted that the virtual buckets can be maintained for memory areas other then statistical segments. For example, they may be maintained for each data portion.

According to another embodiment of the invention the virtual buckets can be used for purposes that differ from pre-fetching. For example they may be used for de-fragmentation purposes—wherein de-fragmentation actions can be responsive to the coldness level of memory areas listed in the virtual buckets.

Figure 11:
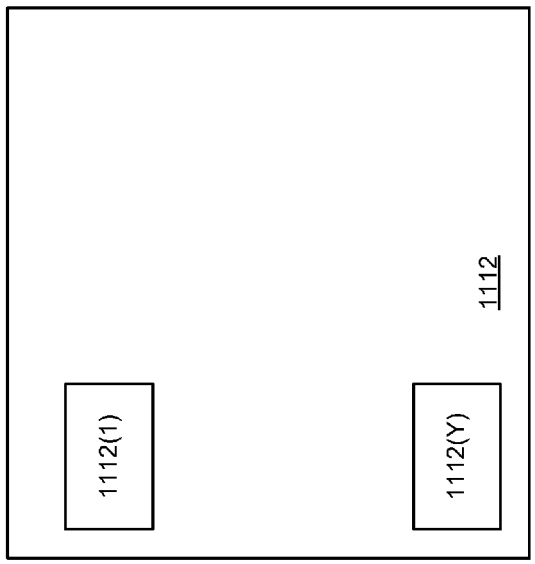
FIG. 11 illustrates statistical segments according to an embodiment of the invention.
Figure 11:
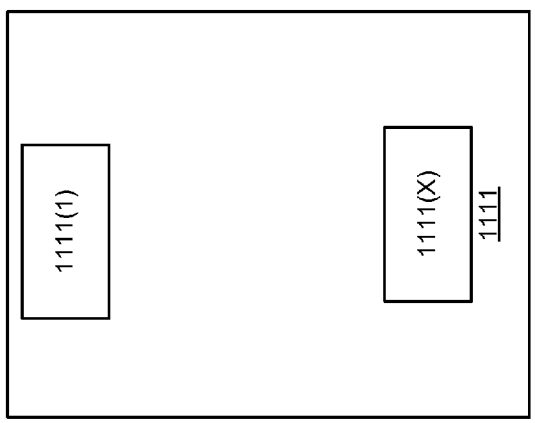

FIG. 11 illustrates statistical segments 1111 and 1112 according to an embodiment of the invention.

The number of statistical segments can exceed two. A single statistical segment can span along one or more logical volumes. FIG. 11 illustrates data portions 1111(1)-1111(x) of virtual segment 1111 and data portions 1112(1)-1112(Y) of statistical segment 1112. Each one of the data portions can be fetched while other data portions (of the same statistical segment or an additional statistical segment) can be pre-fetched.

Figure 10:
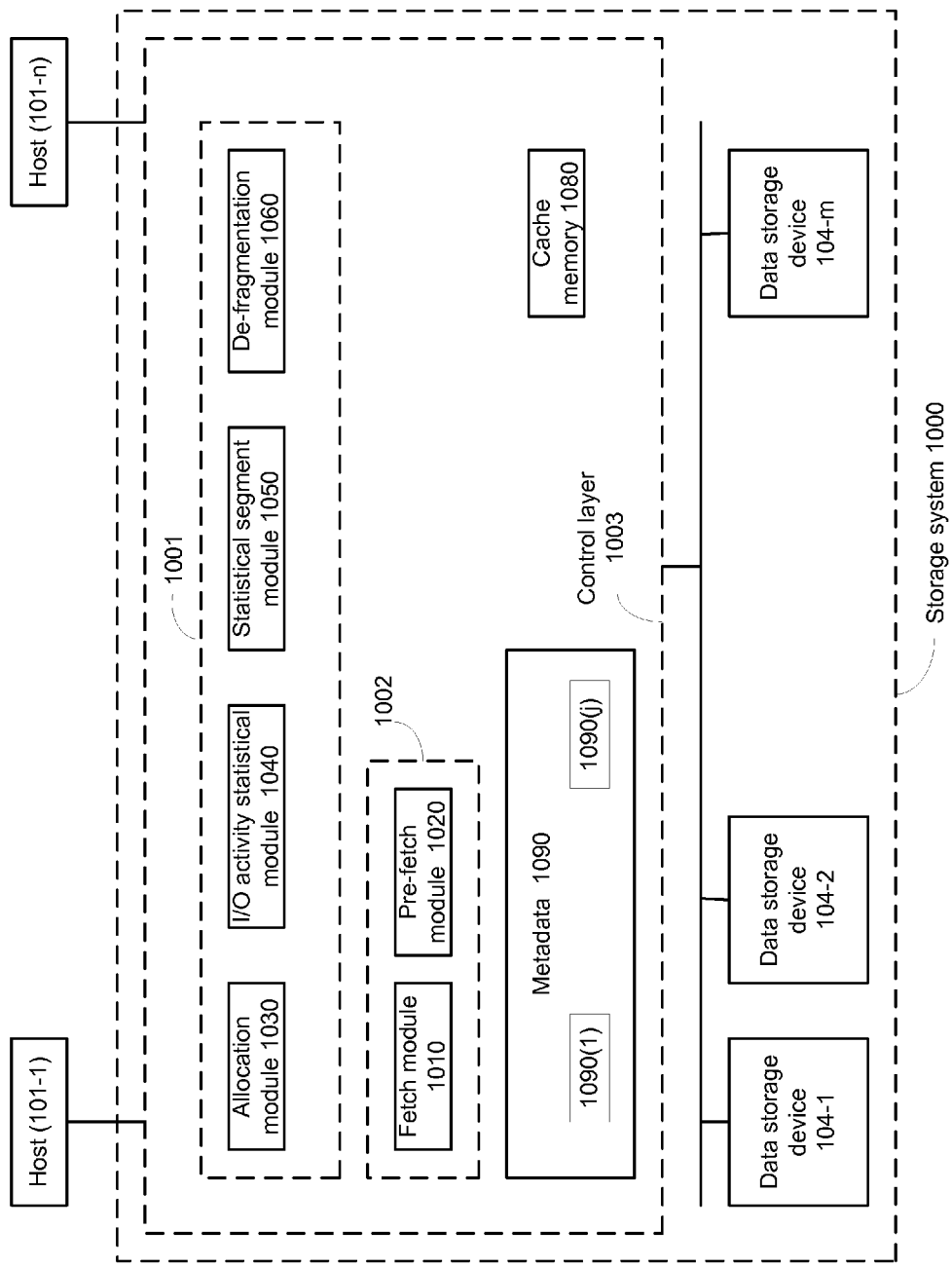
FIG. 10 illustrates a storage system and its environment according to an embodiment of the invention.

FIG. 10 illustrates a storage system 1000 and its environment according to an embodiment of the invention.

Storage system 1000 is coupled to host computers 101-1 till 101-n.

Storage system 1000 includes a control layer 1003 and multiple data storage devices 104-1 till 104-m. These data storage devices differ from a cache memory 1080 of the control layer 1003.

The control layer 1003 can support multiple virtualization layers, such as but not limited the two virtualization layers (first virtual layer (VUS) and second virtual layer (VDS)) of FIGS. 6 and 7.

The data storage devices (104-1 till 104-m) can be disks, flash devices, Solid State Disk (SSD), or other storage means.

The control layer 1003 is illustrated as including multiple modules (1010, 1020, 1030, 1040, 1050 and 1060). It is noted that one or more of the modules includes one or more hardware components.

The storage system 1000 can execute any method mentioned in this specification and can execute any combination of any stages of any methods disclosed in this specification.

The control layer 1003 may include a controller 1001 and a cache controller 1002. The cache controller 1002 includes a fetch module 1010 and a pre-fetch module 1020. It is noted that the controller 1001 and cache controller 1002 can be united and that the modules can be arranged in other manners.

The pre-fetch module 1020 can include (a) a pre-fetch evaluation and decision unit that determines whether to pre-fetch data portions and how to pre-fetch data portions, and (b) a pre-fetch unit that executes the pre-fetch operation. The fetch module 1010 can include a fetch evaluation and decision unit and a fetch unit. For simplicity of explanation these units are not shown.

The allocation module 1030 can be arranged to provide a translation between virtualization layers such as between the first virtual layer (VUS) and the second virtual layer (VDS).

The I/O activity statistical module 1040 can be arranged to calculate I/O activity statistics for each statistical segment by monitoring I/O operations. The I/O activity statistical module 1040 can generate and update various data structures such as activity vectors.

The statistical segment module 1050 can be arranged to generate and maintain statistical segments. The statistical segment module 1050 can be arranged to divide (401) logical volumes into statistical segments so that data portions within a given statistical segment are characterized by the same statistical access pattern.

The de-fragmentation module 1060 may be arranged to perform defragmentation operations—such as those illustrated in relation to FIGS. 3-5.

Metadata 1090 represents metadata that is stores at the control layer 1003. Such metadata 109 can include, for example, logical volume pre-fetch policy rules, statistical segment pre-fetch policy rules and the like. I/O activity statistics can be part of the metadata 1090 or can be stored at the I/O activity statistical module 1040. FIG. 10 illustrates metadata 1090 as including j virtual buckets 1090(1)-1090(j).

The pre-fetch module 1020 can determine when to perform a pre-fetch operation and may control such pre-fetch operation. It may base its decision on values of fields of an activity vector that represents the I/O activity statistics of a statistical segment that includes a data portion that is requested by the host. If one or more certain conditions related to the activity vector are matched, the pre-fetch module can pre-fetch one or more so-called additional data portions from the data storage devices (such as disks) to the cache memory. The total amount of the data that is pre-fetched from the data storage devices to the cache memory may be dependent both on the current activity conditions and on values of the activity vector.

For example, when a host computer requests a certain data portion and the I/O activity level of the statistical segment including that data portion is matching a predefined pre-fetch threshold, the pre-fetch module 1020 may pre-fetch the entire data included in the statistical segment (that includes the certain data portion) from the data storage devices to the cache memory.

Yet for another example, when a host computer requests a certain data block and the I/O activity level of the statistical segment including that certain data portion is matching a predefined pre-fetch threshold, the pre-fetch module 1020 may pre-fetch the entire data included in several statistical segments. In this case the activity vectors of each of the relevant statistical segments may match some similarity criteria.

Yet for a further example, when a host computer requests a specific data portion and the I/O activity level of the statistical segment including that certain data block is matching a predefined pre-fetch threshold, the pre-fetch module 1020 may pre-fetch the entire data included in all statistical segments that have activity vector of the same (or substantially the same) values.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the present invention.

It will also be understood that the system according to the invention can be, at least partly, a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

We claim:

1. A method of pre-fetching, comprising:
   determining, by a pre-fetch module of a storage system, to fetch a certain data portion that was requested by a host computer coupled to the storage system, from a data storage device of the storage system to a cache memory of the storage system; wherein the certain data portion belongs to a certain statistical segment that belongs to at least one logical volume;
   determining, by a pre-fetch module of the storage system, to pre-fetch at least one additional data portion that was not requested by the host computer, to the cache memory based upon input/output (I/O) activity statistics associated with the certain statistical segment;
   wherein the I/O activity statistics associated with the certain statistical segment comprises timing information related to I/O activities associated with the certain statistical segment;
   wherein one or more additional data portions of the at least one additional data portion belong to an additional statistical segment that differs from the certain statistical segment;
   wherein I/O activity statistics associated with the additional statistical segment comprises timing information related to I/O activities associated with the additional statistical segment;
   wherein the I/O activity statistics associated with the certain statistical segment is represented by an activity vector of the certain statistical segment;
   wherein the I/O activity statistics associated with the additional statistical segment is represented by an activity vector of the additional statistical segment;
   wherein a distance between the activity vector of the certain statistical segment and the activity vector of the additional statistical segment is less than a similarity threshold;
   fetching the certain data portion; and
   pre-fetching the at least one additional data portion if it is determined to pre-fetch the at least one additional data portions.

2. The method according to claim 1 wherein the certain statistical segment belongs to a certain logical volume of the at least one logical volume.

3. The method according to claim 2 wherein the additional statistical segment belongs to an additional logical volume that differs from the certain logical volume.

4. The method according to claim 2 wherein the additional statistical segment belongs to the certain logical volume.

5. The method according to claim 1, wherein the certain data portion and all of the at least one additional data portion belong to the certain statistical segment.

6. The method according to claim 1, wherein one or more additional data portions of the at least one additional data portion belong to an additional statistical segment that differs from the certain statistical segment.

7. The method according to claim 6, wherein the determining to pre-fetch the at least one additional data portion is further responsive to I/O activity statistics of the additional statistical segment.

8. The method according to claim 1, comprising updating the similarity threshold.

9. The method according to claim 1, wherein the I/O activity statistics associated with the certain statistical segment represent a frequency of I/O activities associated with the certain statistical segment.

10. The method according to claim 1, wherein the I/O activity statistics associated with the certain statistical segment represent types of I/O activities associated with the certain statistical segment.

11. The method according to claim 1, wherein the I/O activity statistics associated with the certain statistical segment represent types and frequency of I/O activities associated with the certain statistical segment.

12. The method according to claim 1, wherein the activity vector of the certain statistical segment comprises an activity counter field, an activity timestamp field, a defragmentation level field and a defragmentation frequency field.

13. The method according to claim 1, wherein the certain data portion and the at least one additional data portion are all the data portions of the certain statistical segment.

14. The method according to claim 1, wherein the certain data portion and the at least one additional data portion are a subset of all the data portions of the certain statistical segment.

15. The method according to claim 1, wherein the I/O activity statistics that is associated with the certain statistical segment is indicative of a number of I/O accesses to the certain statistical segment during a current activity period;
   wherein the method comprises determining, by the pre-fetch module to pre-fetch the at least one additional data portion of the certain statistical segment to the cache memory if the number of I/O accesses to the certain statistical segment during the current activity period is below an activity threshold.

16. The method according to claim 1, wherein the I/O activity statistics that is associated with the certain statistical segment is indicative of a number of I/O accesses to the certain statistical segment during a current activity period;
   wherein the method comprises determining, by the pre-fetch module to pre-fetch at least one additional data portion of the certain statistical segment to the cache memory if the number of I/O accesses to the certain statistical segment during the current activity period is above an activity threshold.

17. The method according to claim 1, wherein the I/O activity statistics that is associated with the certain statistical segment is indicative of a number of I/O accesses to the certain statistical segment during a current activity period;
   wherein the method comprises determining, by the pre-fetch module, to pre-fetch the at least one additional data portion of the certain statistical segment to the cache memory if the number of I/O accesses to the certain statistical segment during the current activity period belongs to a certain range of I/O activity levels out of multiple different I/O activity levels.

18. The method according to claim 1, wherein the I/O activity statistics that is associated with the certain statistical segment is indicative of a number of I/O accesses to the certain statistical segment during a current activity period;
   wherein the method comprises determining not to pre-fetch the at least one additional data portion of the certain statistical segment if the number of I/O accesses to the certain statistical segment during the current activity period is above an activity threshold.

19. The method according to claim 1, wherein the I/O activity statistics that is associated with the certain statistical segment is indicative of a number of I/O accesses to the certain statistical segment during a current activity period;

wherein the method comprises determining not to pre-fetch the at least one additional data portion of the certain statistical segment if the number of I/O accesses to the certain statistical segment during the current activity period is below an activity threshold.

20. The method according to claim 1, wherein each virtual bucket out of multiple virtual buckets maintains a list of statistical segments accessed during a time interval, wherein different virtual buckets of the multiple virtual buckets maintain lists of statistical segments accessed during different time intervals; and wherein the method comprises maintaining the multiple virtual buckets.

21. The method according to claim 20, comprising determining to pre-fetch additional data portions that belong to at least one additional statistical segment that is listed in a certain virtual bucket in which the certain statistical segment is listed; wherein the certain virtual buckets belongs to the multiple virtual buckets.

22. The method according to claim 20, comprising determining to pre-fetch additional data portions that belong to at least one additional statistical segment that is listed in a certain virtual bucket that is proximate to a virtual bucket in which the certain statistical segment is listed; wherein the certain virtual buckets belongs to the multiple virtual buckets.

23. A storage device, comprising:
a cache memory;
at least one data storage device that differs from the cache memory;
an I/O activity statistical module arranged to generate I/O activity statistics for each statistical segment out of multiple statistical segments of a virtual unit space;
a fetch module arranged to determine to fetch a certain data portion that was requested by a host computer coupled to the storage system, from a data storage device; wherein the certain data portion belongs to a certain statistical segment that belongs to at least one logical volume;
and to fetch the certain data portion;
a pre-fetch module arranged
to determine to pre-fetch at least one additional data portion that was not requested by the host computer, to the cache memory based upon an input/output (I/O) activity pattern associated with the certain statistical segment;
wherein the I/O activity statistics associated with the certain statistical segment comprises timing information related to I/O activities associated with the certain statistical segment;
wherein one or more additional data portions of the at least one additional data portion belong to an additional statistical segment that differs from the certain statistical segment;
wherein I/O activity statistics associated with the additional statistical segment comprises timing information related to I/O activities associated with the additional statistical segment;
wherein the I/O activity statistics associated with the certain statistical segment is represented by an activity vector of the certain statistical segment;
wherein the I/O activity statistics associated with the additional statistical segment is represented by an activity vector of the additional statistical segment;
wherein a distance between the activity vector of the certain statistical segment and the activity vector of the additional statistical segment is less than a similarity threshold;
and
to pre-fetch the at least one additional data portion if it is determined to pre-fetch the at least one additional data portions.

24. The storage system according to claim 23, wherein the certain data portion and all of the at least one additional data portion belong to the certain statistical segment.

25. The storage system according to claim 23, wherein one or more additional data portions belong to an additional statistical segment that differs from the certain statistical segment.

26. The storage system according to claim 25, wherein the pre-fetch module is arranged to determine to pre-fetch the at least one additional data portion in response to I/O activity statistics of the additional statistical segment.

27. The storage system according to claim 23, wherein the storage system is arranged to update the similarity threshold.

28. The storage system according to claim 23, wherein the I/O activity statistics associated with the certain statistical segment represent a frequency of I/O activities associated with the certain statistical segment.

29. The storage system according to claim 23, wherein the I/O activity statistics associated with the certain statistical segment represent types of I/O activities associated with the certain statistical segment.

30. The storage system according to claim 23, wherein the I/O activity statistics associated with the certain statistical segment represent types and frequency of I/O activities associated with the certain statistical segment.

31. The storage system according to claim 23, wherein the activity vector of the certain statistical segment comprises an activity counter field, an activity timestamp field, a defragmentation level field and a defragmentation frequency field.

32. The storage system according to claim 23, wherein the certain data portion and the at least one additional data portion are all the data portions of the certain statistical segment.

33. The storage system according to claim 23, wherein the certain data portion and the at least one additional data portion are a subset of all the data portions of the certain statistical segment.

34. The storage system according to claim 23, wherein the I/O activity statistics that is associated with the certain statistical segment is indicative of a number of I/O accesses to the certain statistical segment during a current activity period; wherein the pre-fetch module is arranged to determine to pre-fetch the at least one additional data portion of the certain statistical segment to the cache memory if the number of I/O accesses to the certain statistical segment during the current activity period is below an activity threshold.

35. The storage system according to claim 23, wherein the I/O activity statistics that is associated with the certain statistical segment is indicative of a number of I/O accesses to the certain statistical segment during a current activity period; wherein the pre-fetch module is arranged to determine to pre-fetch at least one additional data portion of the certain statistical segment to the cache memory if the number of I/O accesses to the certain statistical segment during the current activity period is above an activity threshold.

36. The storage system according to claim 23, wherein the I/O activity statistics that is associated with the certain statistical segment is indicative of a number of I/O accesses to the certain statistical segment during a current activity period; wherein the pre-fetch module is arranged to determine to pre-fetch the at least one additional data portion of the certain statistical segment to the cache memory if the number of I/O accesses to the certain statistical segment during the current activity period belongs to a certain range of I/O activity levels out of multiple different I/O activity levels.

37. The storage system according to claim 23, wherein the I/O activity statistics associated with the certain statistical segment is indicative of a number of I/O accesses to the certain statistical segment during a current activity period; wherein the pre-fetch module is arranged to determine not to pre-fetch the at least one additional data portion of the certain statistical segment if the number of I/O accesses to the certain statistical segment during the current activity period is above an activity threshold.

38. The storage system according to claim 23, wherein the I/O activity statistics associated with the certain statistical segment is indicative of a number of I/O accesses to the certain statistical segment during a current activity period; wherein the pre-fetch module is arranged to determine not to pre-fetch the at least one additional data portion of the certain statistical segment if the number of I/O accesses to the certain statistical segment during the current activity period is below an activity threshold.

39. The storage system according to claim 23, wherein each virtual bucket out of multiple virtual buckets maintains a list of statistical segments accessed during a time interval, wherein different virtual buckets of the multiple virtual buckets maintain lists of statistical segments accessed during different time intervals; and wherein the storage system comprises an allocation unit arranged to maintain the multiple virtual buckets.

40. The storage system according to claim 39, wherein the pre-fetch module is arranged to determine to pre-fetch additional data portions that belong to at least one additional statistical segment that is listed in a certain virtual bucket in which the certain statistical segment is listed; wherein the certain virtual buckets belongs to the multiple virtual buckets.

41. The storage system according to claim 39, wherein the pre-fetch module is arranged to determine to pre-fetch additional data portions that belong to at least one additional statistical segment that is listed in a certain virtual bucket that is proximate to a virtual bucket in which the certain statistical segment is listed; wherein the certain virtual buckets belongs to the multiple virtual buckets.

42. A non-transitory computer readable medium that stores instructions for: determining, by a pre-fetch module of the storage system of a storage system, to fetch a certain data portion that was requested by a host computer coupled to the storage system, from a data storage device of the storage system to a cache memory of the storage system; wherein the certain data portion belongs to a certain statistical segment that belongs to at least one logical volume; determining, by the pre-fetch module, to pre-fetch at least one additional data portion that was not requested by the host computer, to the cache memory based upon an input/output (I/O) activity pattern associated with the certain statistical segment; wherein the I/O activity statistics associated with the certain statistical segment comprises timing information related to I/O activities associated with the certain statistical segment; wherein one or more additional data portions of the at least one additional data portion belong to an additional statistical segment that differs from the certain statistical segment; wherein I/O activity statistics associated with the additional statistical segment comprises timing information related to I/O activities associated with the additional statistical segment; wherein the I/O activity statistics associated with the certain statistical segment is represented by an activity vector of the certain statistical segment; wherein the I/O activity statistics associated with the additional statistical segment is represented by an activity vector of the additional statistical segment; wherein a distance between the activity vector of the certain statistical segment and the activity vector of the additional statistical segment is less than a similarity threshold; fetching the certain data portion; and pre-fetching the at least one additional data portion if it is determined to pre-fetch the at least one additional data portions.

* * * * *